US011240837B2

(12) United States Patent
Faurie et al.

(10) Patent No.: US 11,240,837 B2
(45) Date of Patent: *Feb. 1, 2022

(54) TRANSMITTING A SCHEDULING REQUEST FOR A DEVICE-TO-DEVICE TRANSMISSION

(71) Applicant: BlackBerry Limited, Waterloo (CA)

(72) Inventors: Rene Faurie, Versailles (FR); Eswar Vutukuri, Havant (GB); Takashi Suzuki, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,687

(22) Filed: Aug. 27, 2018

(65) Prior Publication Data

US 2019/0082459 A1 Mar. 14, 2019

Related U.S. Application Data

(63) Continuation of application No. 14/712,785, filed on May 14, 2015, now Pat. No. 10,064,212.

(51) Int. Cl.
*H04W 72/14* (2009.01)
*H04W 72/12* (2009.01)
*H04W 28/02* (2009.01)
*H04W 8/00* (2009.01)
*H04W 88/04* (2009.01)
(Continued)

(52) U.S. Cl.
CPC ....... *H04W 72/14* (2013.01); *H04W 28/0278* (2013.01); *H04W 72/1278* (2013.01); *H04W 8/005* (2013.01); *H04W 76/14* (2018.02); *H04W 88/04* (2013.01); *H04W 88/08* (2013.01)

(58) Field of Classification Search
CPC ......... H04W 28/0278; H04W 72/1278; H04W 72/14
See application file for complete search history.

(56) References Cited

U.S. PATENT DOCUMENTS 9,942,917 B2 4/2018 Faurie et al.
10,064,212 B2 8/2018 Faurie et al.
(Continued)

FOREIGN PATENT DOCUMENTS

EP 2890193 7/2015
WO 2015050396 4/2015

OTHER PUBLICATIONS

Non-Final Office Action issued in U.S. Appl. No. 15/948,439 dated Jan. 11, 2019, 12 pages.
(Continued)

*Primary Examiner* — Rhonda L Murphy
(74) *Attorney, Agent, or Firm* — Fish & Richardson P.C.

(57) ABSTRACT

A method for transmitting a scheduling request includes receiving, at a relay UE and from a remote UE, a sidelink control information. The relay UE is within a coverage area of a base station. The remote UE is outside of the coverage area. The relay UE is configured to relay transmissions from the remote UE to the base station, and the sidelink control information indicates a future transmission of a data packet over a sidelink channel. A scheduling request is transmitted to a base station. A scheduling grant that indicates an uplink resource is received from the base station. A data packet over the sidelink channel is received from the remote UE.

17 Claims, 18 Drawing Sheets

(51) Int. Cl.
  *H04W 76/14* (2018.01)
  *H04W 88/08* (2009.01)

(56) References Cited

U.S. PATENT DOCUMENTS

| | | | |
|---|---|---|---|
| 10,425,915 | B2 | 9/2019 | Sheng et al. |
| 10,638,506 | B2 | 4/2020 | Faurie et al. |
| 2009/0116430 | A1 | 5/2009 | Bonta et al. |
| 2010/0056161 | A1 | 3/2010 | Matsumura |
| 2013/0308549 | A1 | 11/2013 | Madan et al. |
| 2014/0086152 | A1 | 3/2014 | Bontu et al. |
| 2015/0146677 | A1 | 5/2015 | Ito |
| 2016/0128094 | A1 | 5/2016 | Lee |
| 2016/0219620 | A1 | 7/2016 | Lee |
| 2016/0302250 | A1 | 10/2016 | Sheng |
| 2016/0323869 | A1 | 11/2016 | Xu et al. |
| 2016/0338094 | A1 | 11/2016 | Faurie et al. |
| 2016/0338095 | A1 | 11/2016 | Faurie et al. |
| 2017/0019910 | A1* | 1/2017 | Seo .............. H04W 76/10 |
| 2017/0064534 | A1 | 3/2017 | Loehr |
| 2017/0188404 | A1 | 6/2017 | Fodor |
| 2018/0124621 | A1 | 5/2018 | Jung et al. |
| 2018/0132254 | A1* | 5/2018 | Chae .............. H04W 72/02 |
| 2018/0139724 | A1 | 5/2018 | Loehr et al. |
| 2018/0295646 | A1 | 10/2018 | Faurie et al. |
| 2020/0008068 | A1* | 1/2020 | Belleschi .......... H04W 16/10 |
| 2020/0068564 | A1* | 2/2020 | Kim .............. H04W 76/28 |
| 2020/0359408 | A1 | 11/2020 | Faurie et al. |

OTHER PUBLICATIONS

"Resource allocation for UE-to-Network relay", 3GPP Draft; R1-151279; 3rd Generation Partnership Project (3GPP), vol. RAN WG1, Apr. 19, 2015, 3 pages, URL: http://www.3gpp.org/ftp/Meetings_3GPP_SYNC/RAN1/Docs/.

"Discussion on UE-to-NW Relay Implementation Aspects", 3GPP Draft; R1-151442 Intel—L3 Relay, 3rd Generation Partnership Project (3GPP), vol. RAN WG 1, Apr. 19, 2015, 9 pages, URL: http://www.3gpp.org/ftp/Meetings_3GPPSYNC/RAN1/Docs/.

"Operator controlled device-to-device communications in LTE-advanced networks", IEEE Wireless Communications, vol. 19, No. 3, Jun. 1, 2012, (ISSN: 1536-1284, DOI: 0.1109/MWC.2012. 6231164), pp. 96-104 (9 pages).

International Search Report and Written Opinion of the International Searching Authority issued in International Application No. PCT/GB2015/052357, dated Jan. 22, 2016, 14 pages.

International Search Report and Written Opinion of the International Searching Authority issued in International Application No. PCT/GB2015/052356 dated Jan. 22, 2016, 13 pages.

Office Action issued in U.S. Appl. No. 14/712,785 dated May 19, 2017; 11 pages.

Advisory Action issued in U.S. Appl. No. 14/712,785 dated Aug. 9, 2017; 3 pages.

Office Action issued in U.S. Appl. No. 14/712,785 dated Sep. 12, 2017; 12 pages.

Communication Pursuant to Article 94(3) EPC issued in European Application No. 15753430.6, dated Jul. 24, 2019, 8 pages.

Notice of Allowance issued in U.S. Appl. No. 15/948,439 dated Dec. 19, 2019, 13 pages.

Extended European Search Report issued in European Application No. 19215489.6 dated Mar. 13, 2020, 11 pages.

Cewit, "A Common Framework for D2D Resource Allocation for In-Network and Out-Of-Network Coverage Scenarios" 3GPP Draft, 3GPP RAN WG2, Mobile Competence Centre, R2-140395, Sophia-Antipolis, France, Feb. 10-14, 2014, 4 pages.

Communication Pursuant to Article 94 (3) EPC issued in European Application No. 15753430.6 dated Nov. 11, 2020, 8 pages.

Non-Final Office Action issued in U.S. Appl. No. 16/859,718 dated Feb. 19, 2021, 35 pages.

Final Office Action issued in U.S. Appl. No. 16/859,718 dated Aug. 17, 2021, 24 pages.

Office Action issued in Canadian Application No. 2985922, dated Aug. 19, 2021, 4 pages.

* cited by examiner

1400

TRANSMITTING A SCHEDULING REQUEST FOR A DEVICE-TO-DEVICE TRANSMISSION

CROSS REFERENCE TO RELATED APPLICATION

This patent is a continuation of and claims the benefit of U.S. Non-Provisional application Ser. No. 14/712,785, filed May 14, 2015, the entire contents of which is hereby expressly incorporated by reference herein in its entirety.

TECHNICAL FIELD

This disclosure relates to data transmission in wireless communication systems and, more specifically, to transmitting a scheduling request for device-to-device transmissions.

BACKGROUND

In a device-to-device (D2D) communication, a user equipment may transmit to another user equipment directly using an enhanced cellular radio access technology. Examples of the cellular radio access technology that can be enhanced for D2D communications include Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), LTE-Advanced, any other cellular technology or a wireless broadband access technology, such as Wi-Fi technology. In one example, a user equipment may transmit directly to another user equipment in a D2D communication using the LTE radio access technology.

DESCRIPTION OF DRAWINGS

Like reference numbers and designations in the various drawings indicate like elements.

DETAILED DESCRIPTION

Figure 1:
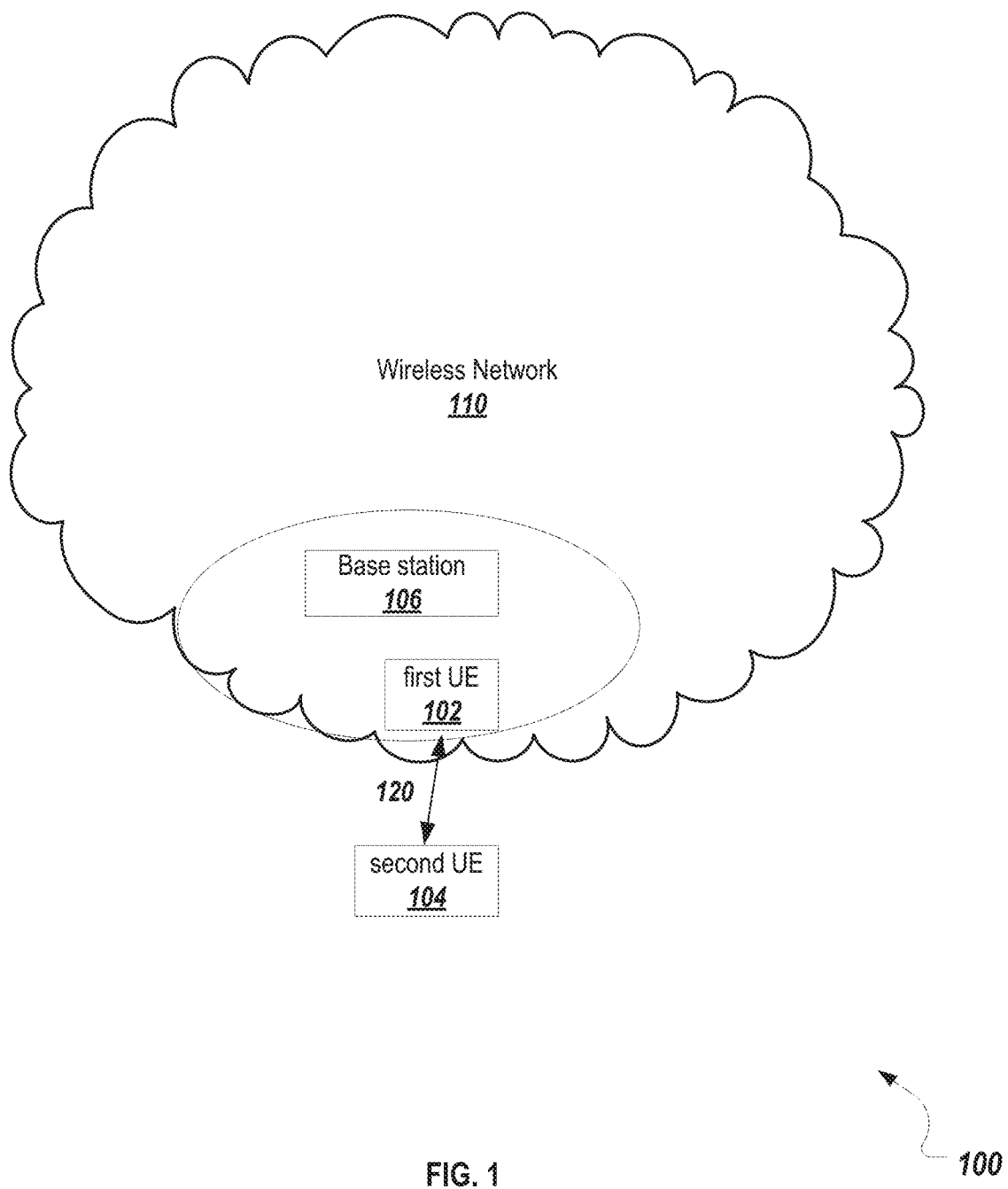
FIG. 1 is an example wireless communication system that allocates resources for device-to-device (D2D) transmissions.

The present disclosure is directed to allocating resources for device-to-device (D2D) transmissions in a system capable of D2D communications. D2D communications can be used to provide commercial services, e.g., a Mission Critical Push-To-Talk (MCPTT) service. The MCPTT service supports an enhanced Push-To-Talk (PTT) service that can be used for professional groups, e.g., public safety departments, transport companies, utilities, industrial plants, or nuclear plants, or non-professional groups, e.g., groups of people on holiday. In some cases, the MCPTT service supports group calls among several users, as well as private calls between a pair of users. In some cases, the MCPTT service may use The Third Generation Partnership Project (3GPP) transport communication mechanisms provided by the Evolved Packet System (EPS) architectures to establish, maintain, and terminate the actual communication paths among the users. In some cases, the MCPTT service may use non-3GPP, e.g., dispatcher or administer, access technologies and architectures.

In some cases, the communications between the users in a group in the MCPTT service may be implemented using D2D transmissions. For example, in some cases, a UE may be in a location that is out of the coverage of a cellular network. Such a UE may be referred to as a remote UE. In some cases, such a UE may be referred to as a second UE. In these or other cases, the remote UE may use D2D transmissions to communicate with another UE in the same MCPTT group. For example, the remote UE may use a D2D transmission to send a data packet to a relay UE that is in the coverage of the network. The relay UE can relay the data packet to the network, which forwards the data packet to other UEs in the MCPTT group. Similarly, the relay UE can relay the data packets received from the network to the remote UE in a D2D transmission. In some cases, the D2D transmission can be referred to as a Proximity-based Service (ProSe). In some cases, the D2D transmission can be referred to as a direct communication. In some cases, the interface between corresponding UEs in a D2D transmission can be referred to as a PC5 interface. In some cases, the transmission link between corresponding UEs in a D2D transmission can be referred to as a sidelink transmission link, which can be distinguished from an uplink (UE to base station) or from a downlink (base station to UE) transmission link. In some cases, the relay UE can be referred to as a UE-to-Network Relay (UNR). In some or other cases, the relay UE may be in a location that is out of the coverage of a cellular network and may use D2D transmissions to relay information between other UEs. In these or other cases, the relay UE can be referred to as a UE-to-UE Relay (UUR). In some cases, the relay UE may be referred to as a first UE.

In some cases, the resource for a D2D transmission may include resources that a UE can use to transmit control information, data packets, or a combination thereof. As discussed herein, "resource" or "resources" may each include indifferently a single resource or multiple resources. For example, the resource can include Physical Sidelink Control Channel (PSCCH) resources for the transmission of Sidelink Control Information (SCI). The resource can also include Physical Sidelink Shared Channel (PSSCH) resources for the transmission of sidelink data packets. In some cases, the SCI may be used to indicate scheduling information to the ProSe receiving UEs. The ProSe receiving UE may use the SCI to identify the sidelink resources that are used to transmit data on the PSSCH.

In some cases, a UE may be in a network scheduled mode or in an autonomous selection mode. In some cases, the network scheduled mode may be referred to as a network scheduled allocation mode or as Mode 1. In some cases, the autonomous selection mode may be referred to as an autonomous resource selection mode or as Mode 2. If a UE is in a network scheduled mode, the UE may request the resource from a base station. Alternatively, if a UE is in an autonomous selection mode, the UE may select the resource from one or more resource pools. The one or more resource pools may be signaled by the base station using a broadcast message or a dedicated message. Alternatively or in combination, the one or more resource pools may be preconfigured at the UE. As discussed herein, "pool" or "pools" may each include indifferently a single pool or multiple pools. In some case, a base station may use a broadcast or a dedicated message to indicate which mode should be used by the UEs in the coverage of the base station.

In some cases, a base station may specify a particular mode, e.g., either a network scheduled mode or an autonomous selection mode, for the UEs in the coverage of the base station. In some cases, for example, when a UE that is out of a coverage of a base station, the UE may not be able to request resources from the base station. Therefore, the UE may not use the network scheduled mode, and the UE may use autonomous selection mode instead. Because a UE in the autonomous selection mode does not coordinate with other UEs or the base station in selecting resources, the resources selected by the UE may collide with resources selected by other UEs operating in the autonomous selection mode, or resources assigned by the base station to a UE operating in the network scheduled mode. The possibilities of collisions increase as the number of remote UEs that are in proximity to one another increases. A collision of resources may result in failures for the D2D transmissions and, therefore, delay or prevent the successful delivery of data packets between the UEs.

In some cases, in order to reduce the effects of the resource collision and associated transmission failure, a UE may repeat the data packet transmissions for multiple times. Such repetition may be inefficient because it increases the resources used to transmit the same packet and sometimes still does not avoid collisions. In some cases, this approach may cause a traffic peak and consequently further increase the collisions. In some cases, the resource pools may be overprovisioned to reduce the possibilities of collisions. Alternatively, different pools may be configured for different UEs. However, because the total amount of resources available for D2D transmissions may be limited, these approaches may not be practical if there are a large amount of UEs that use D2D transmissions.

FIG. 1 is an example wireless communication system 100 that allocates resources for D2D transmissions. For example, a resource allocation configuration may be transmitted from a first UE to a second UE for device-to-device communications. The resource allocation configuration may be determined by at least one of the base station and the first UE. In some cases, some of the resource allocation configuration information may be pre-configured at the first or the second UE. In some cases, the first UE may operate in an autonomous selection mode. A resource request for a device-to-device transmission may be received from the second UE. In response to the resource request, a resource for the device-to-device transmission may be selected at the first UE. A resource grant may be transmitted to the second UE. The resource grant may identify the selected resource. A device-to-device transmission may be received from the second UE over the selected resource.

In some implementations, a resource allocation configuration may be transmitted from a first UE to a second UE for device-to-device communications. In some cases, the first UE may operate in a network scheduled mode. A resource request for a device-to-device transmission may be received from the second UE. A sidelink resource request may be transmitted to a base station in response to the resource request. In response to the sidelink resource request, a sidelink allocation information may be received. The sidelink allocation information may identify the resource for the device-to-device transmission. A resource grant may be transmitted to the second UE. The resource grant may identify the selected resource. A device-to-device transmission is received from the second UE over the selected resource.

In some implementations, a sidelink control information may be received at a relay UE from a remote UE. The relay UE may be within a coverage area of a base station. The coverage area of the base station may be a coverage area providing access to a PLMN service in which the second UE is interested. The PLMN service may be a MCPTT service. The remote UE may be outside of the coverage area. The relay UE may be configured to relay transmissions from the remote UE to the base station. The sidelink control information may indicate a future transmission of a data packet over a sidelink channel. A scheduling request may be transmitted to a base station. In some cases, the scheduling request may be transmitted to the base station before a start of the future transmission of the data packet. In some cases, the data packet may be transmitted in more than one redundancy version, and the scheduling request for uplink transmission may be transmitted to the base station in response to receiving one or more redundancy versions of the data packet or an SCI in PSCCH. In some cases, the scheduling request may be transmitted to the base station after at least one data packet is decoded at the relay UE. A scheduling grant that indicates an uplink resource may be received from the base station. A data packet over the sidelink channel may be received from the remote UE. The data packet may be transmitted to the base station using the uplink resource.

Allocating resources for D2D transmissions according to methods and systems described herein may provide one or more advantages. For example, a relay UE may schedule resources for a remote UE and select the resources that may minimize collisions with other resources. In some cases, a UE may coordinate the resource selections with other UEs to further minimize collisions. In some cases, the base station may also avoid or reduce substantially scheduling transmissions that may overlap with D2D transmissions by considering the resource configuration used for D2D transmissions. In addition, signaling overhead for allocating resources and coordinating may be reduced by extending the resource allocation period. In some cases, signaling overhead may be further reduced by preconfiguring a subset of resource pools in a UE.

At a high level, the example wireless communication system 100 includes a wireless communication network 110, which includes a base station 106 that is configured to communicate with a first UE 102. In some cases, the connecting interface between the first UE 102 and the base station 106 may be referred to as a Uu interface. In the illustrated example, the first UE 102 is communicatively coupled with a second UE 104. The first and the second UEs communicate using D2D transmissions over a sidelink 120. In the illustrated example, the first UE 102 is within the coverage area of the base station 106 and the second UE 104 is outside of the coverage area of the base station 106. In some cases, the first UE 102 may serve as a relay UE to relay data packets received from the second UE 104 to the base station 106, and to relay data packets received from the base station 106 to the second UE 104. In some cases, both the first and the second UEs may be within the coverage area of the base station 106, or within the coverage areas of different base stations. In some cases, one base station may provide a service that the second UE wishes to receive and one other base station may not. In some cases, both the first and the second UEs may be outside the coverage areas of any base stations in the wireless network 110.

In some cases, the first UE 102 operates in an autonomous selection mode. A resource allocation configuration for device-to-device communications is transmitted from the first UE 102 to the second UE 104. A resource request for a device-to-device transmission is received from the second UE 104. In response to the resource request, a resource for the device-to-device transmission is selected at the first UE 102. A resource grant is transmitted to the second UE 104. The resource grant identifies the selected resource. A device-to-device transmission is received from the second UE 104 over the selected resource. FIGS. 2-18 and associated descriptions provide additional details for these implementations.

In some cases, the first UE 102 operates in a network scheduled mode. A resource request for a device-to-device transmission is received from the second UE 104. A sidelink resource request is transmitted to the base station 106 in response to the resource request. In response to the sidelink resource request, a sidelink allocation information is received. The sidelink allocation information identifies the resource scheduled for the device-to-device transmission. A resource grant is transmitted to the second UE 104. The resource grant identifies the scheduled resource. A device-to-device transmission is received from the second UE 104 over the scheduled resource. FIGS. 2-18 and associated descriptions provide additional details for these implementations.

Turning to a general description of the elements, a UE may be referred to as mobile electronic device, user device, mobile station, subscriber station, portable electronic device, mobile communications device, wireless modem, or wireless terminal. Examples of a UE (e.g., the first UE 102 or the second UE 104) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic device. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station 106. A base station 106 may be a radio base station that may control all or at least some radio-related functions in a fixed part of the system. The base station 106 may provide radio interface within their coverage area or a cell for a UE to communicate. The base station 106 may be distributed throughout the cellular network to provide a wide area of coverage. The base station 106 directly communicates to one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
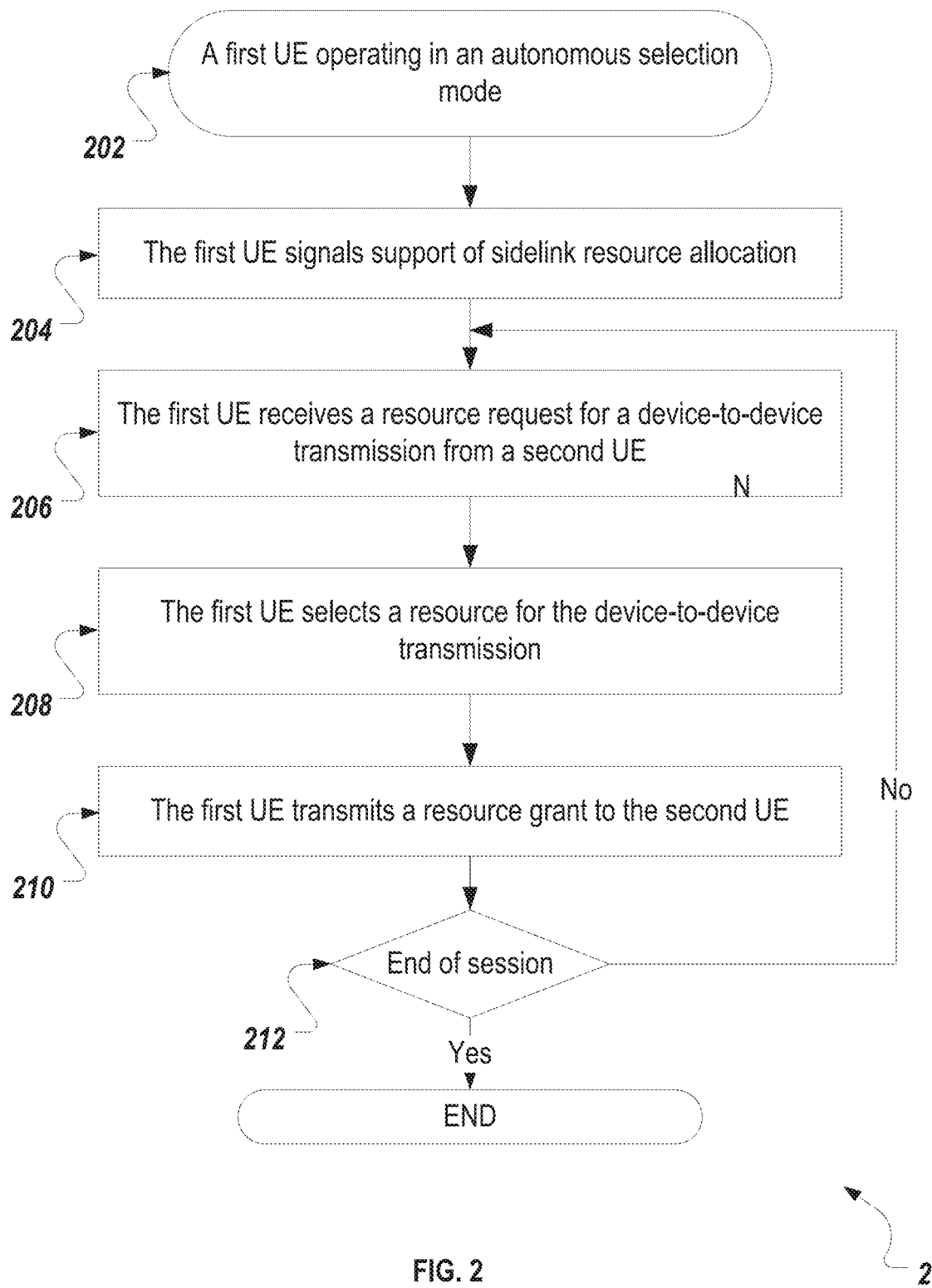
FIG. 2 is a flowchart illustrating an example process for allocating resources in an autonomous selection mode.

FIG. 2 is a flowchart illustrating an example process 200 implementing a technique for scheduling resources allocation for remote UEs by a UE operating in an autonomous selection mode. This technique may also be referred to as a remote resource allocation, a remote sidelink resource allocation or a remote D2D resource allocation. The process 200 may begin at block 202, where a first UE operates in an autonomous selection mode. In some cases, the first UE may be a relay UE. In some cases, the first UE may be a UE-to-Network Relay or a UE-to-UE Relay. In some cases, the first UE may be a remote UE. In some implementations, as described in more detail below, the first UE may select the radio resources for the D2D transmissions of other UEs.

Figure 4:
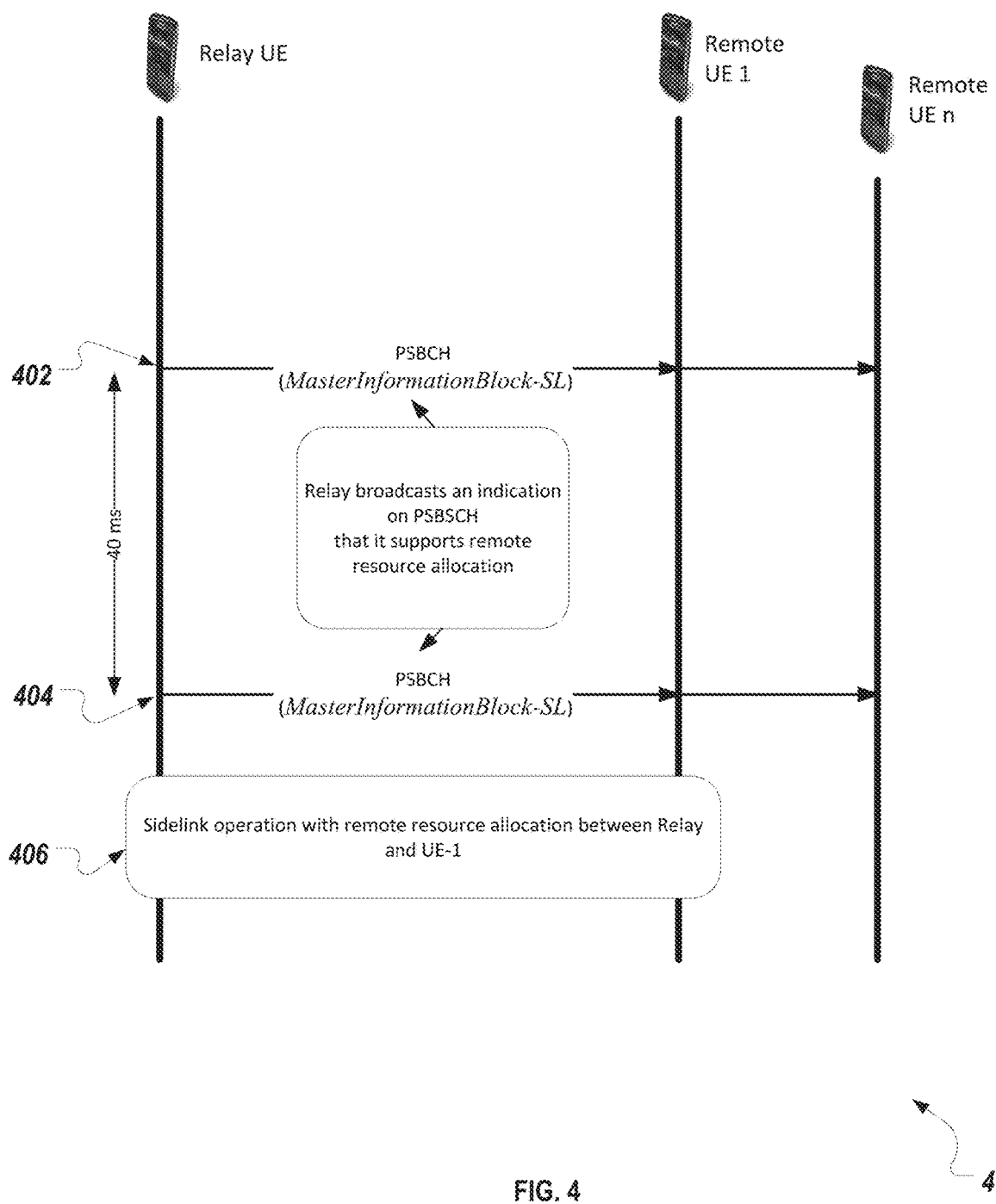
FIG. 4 is a message flow diagram illustrating an example process for transmitting a resource allocation configuration.

At block 204, the first UE signals a resource allocation configuration to other UEs. The resource allocation configuration may be determined by at least one of the base station and the first UE or may consist in pre-configured information within at least one of the first and the second UEs. In some cases, a resource allocation configuration may indicate a remote resource allocation capability. The remote resource allocation capability may instruct or enable other UEs to request D2D resources from the first UE. In some cases, the resource allocation configuration may include information of resource pool for sidelink transmissions. FIG. 4 and associated descriptions provide additional details according to an example implementation.

At block 206, the first UE receives a resource request for a device-to-device transmission from a second UE. In some cases, the second UE may be a remote UE. In some cases, the second UE may be a UE that is within a network coverage, and therefore, is not able or not configured to receive a service from the network. In some cases, an assigned sidelink resource is valid in a Sidelink Control (SC) period. In these or other cases, the second UE may send a request for each SC period. The request may be sent before the start of a SC period for which the resource is requested, and the second UE may allocate the resource for the SC period.

In some cases, the request may include Quality of Service (QoS) information. Examples of QoS information may include QoS Class Identifier (QCI), Guaranteed Bit Rate (GBR), Maximum Bit Rate (MBR), or priority. The QoS information may be used by the first UE to determine the type of resources that the second UE is requesting. For example, the QCI may be set to a value that represents a voice service, a data service, or a combination thereof.

In some cases, the request may also include information about the amount of data to be transmitted. For example, the request may include a Buffer Status Report (BSR) that indicates the buffer size for the data to be transmitted. In some cases, the request may include resource categorization information, e.g., the duration of the resource, the size of the resource, etc.

The following is an example of the resource request message for a sidelink resource.

| ResourceAllocationRequest message |
| --- |
| -- ASN1START |
| ResourceAllocationRequest ::=    SEQUENCE { |
|    groupId-r13          INTEGER (0..63), |
|    qCI-r13              INTEGER (0..255) |
|    priority-r13         INTEGER (1..16), |
|    lCG-ID-r13           INTEGER (0..3), |
|    bufferSize-r13       INTEGER (0..63)        OPTIONAL |
| } |
| -- ASN1STOP |

| ResourceAllocationRequest field descriptions |
| --- |
| groupId |
| Indicates the identifier of the group for which sidelink resources are requested. |
| qCI |
| Indicates the QCI associated to the direct communication session for which sidelink resources are requested. |
| lCG-ID |
| Identifies the group of logical channel(s) for which sidelink resources are requested. Should be set to "11" in this version of the specification. |
| bufferSize |
| Provides information about the amount of data to be sent per LCG or per UE. |

Figure 6:
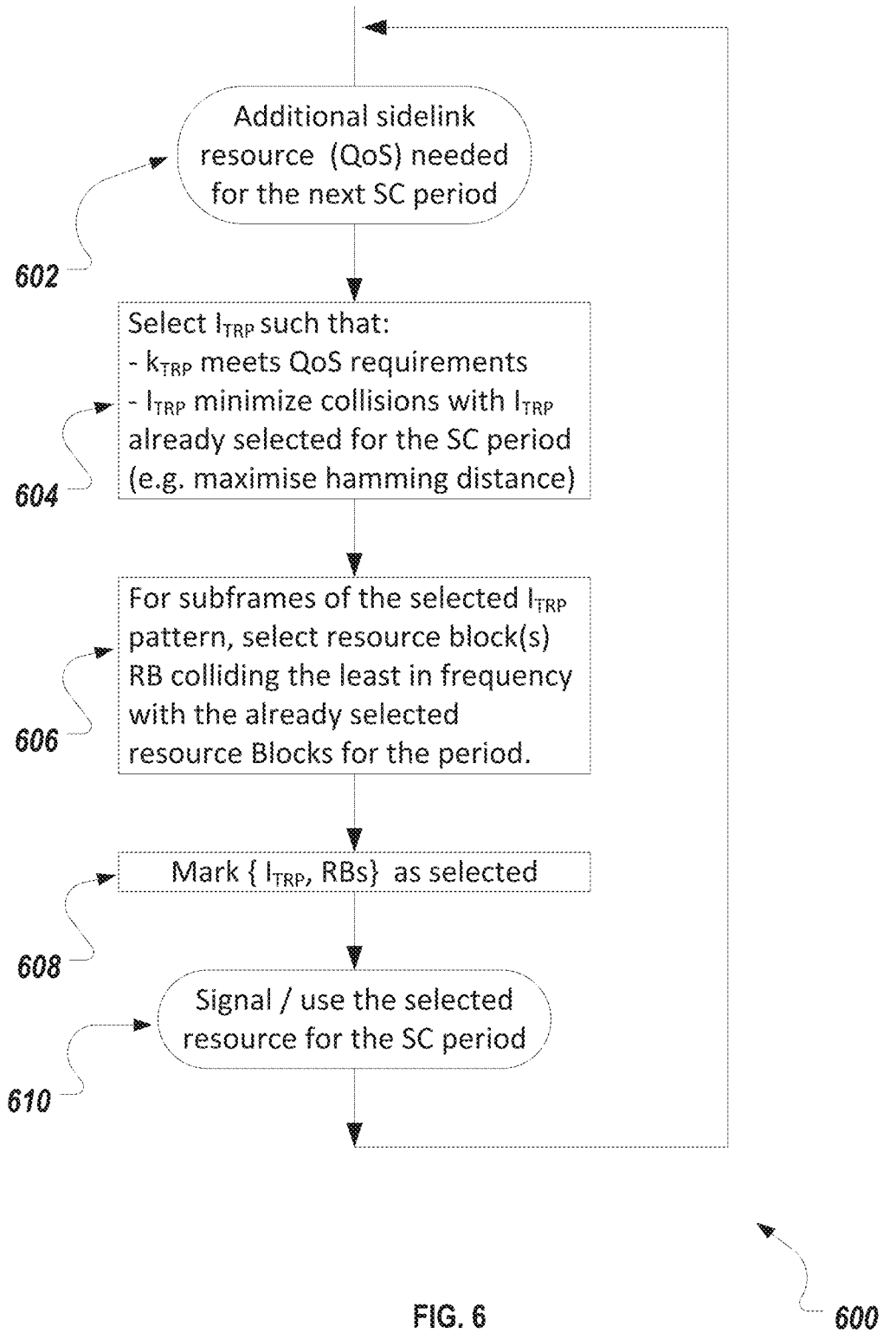
FIG. 6 is a flowchart diagram illustrating an example resource selection process.
Figure 7:
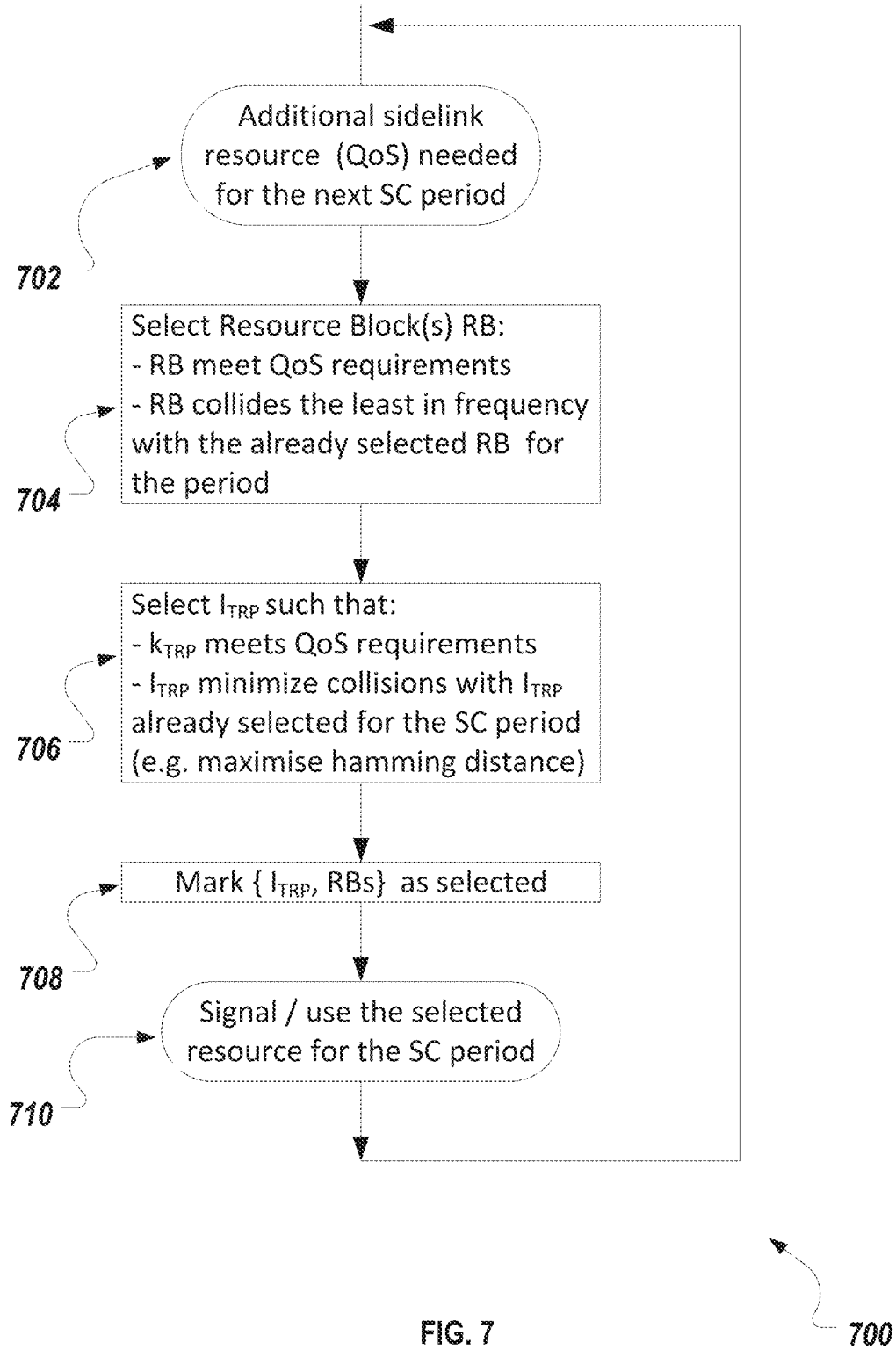
FIG. 7 is a flowchart illustrating an example frequency-first resource selection process.
Figure 8:
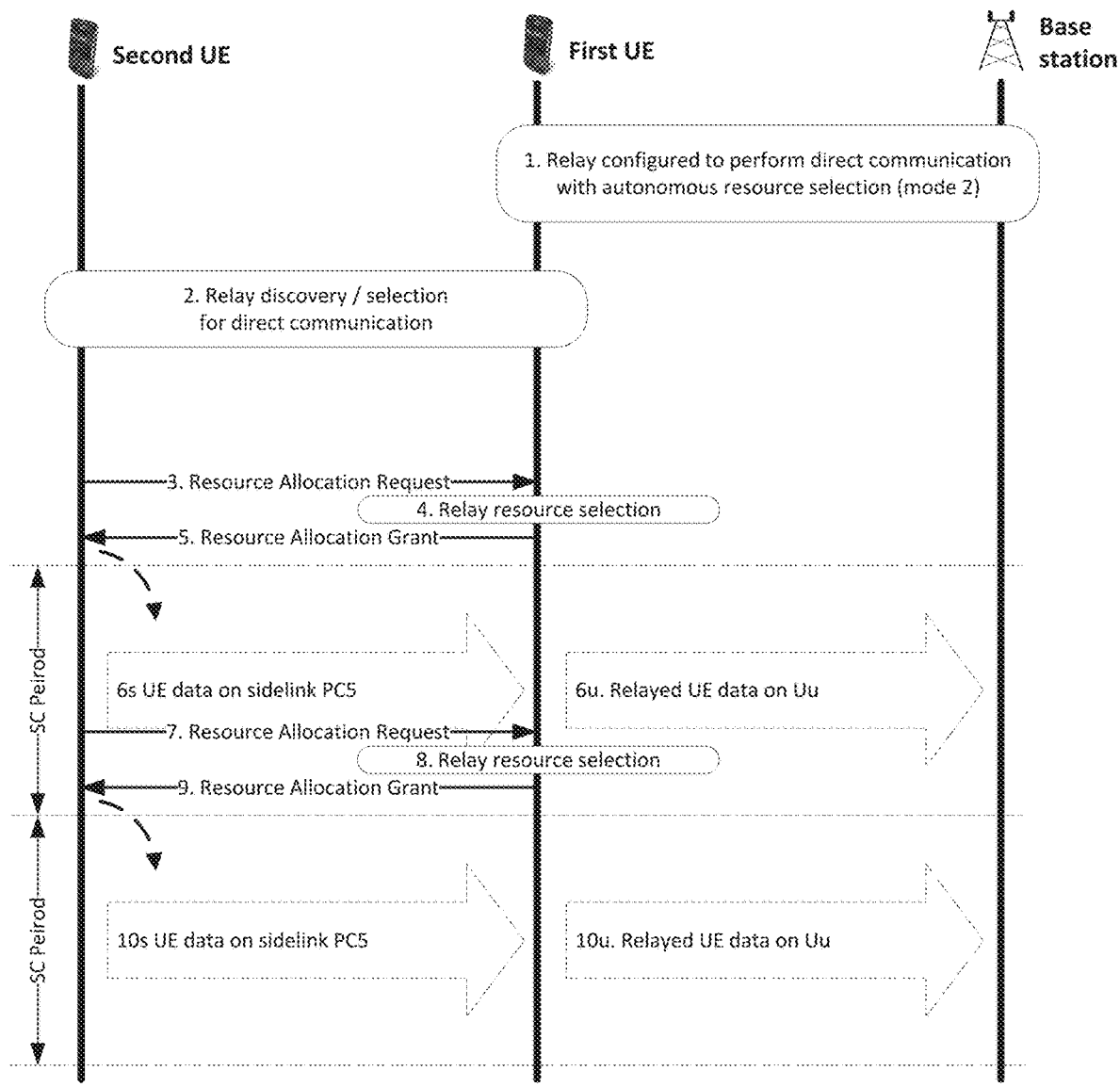
FIG. 8 is a message flow diagram illustrating an example resource allocation process for a user equipment (UE) that operates in an autonomous selection mode.

At block 208, the first UE selects a resource for the D2D transmission. In some cases, the first UE may select the resource to minimize collisions with other assigned resources. FIGS. 6-8 and associated descriptions provide additional details according to an example implementation.

At block 210, the first UE transmits a resource grant to the second UE. The resource grant can be used by the second UE to identify the resource for the D2D transmission.

In some cases, the second UE may use the following two types of information to identify the resources: description of a pool of resources and scheduling information.

In some cases, a pool of resources for D2D transmissions may be configured by a base station. The first UE may transmit the description of the pool of resources to the second UE before the start of an SC period. In some cases, the first UE may transmit the description of the pool of resources to the second UE as a resource allocation configuration. In some cases, as described before, the description of the pool of resources may be included in the resource allocation configuration at block 204. In one example, the description may be transmitted to the second UE as part of relay information or relay status over a Sidelink Discovery CHannel (SL-DCH), a Physical Sidelink Downlink Discovery CHannel (PSDCH) or another sidelink channel during a relay discovery or the relay selection procedure. In another example, the description may be transmitted to the second UE in a system information block broadcast message over a Sidelink Broadcast CHannel (SL-BCH) or a Physical Sidelink Broadcast CHannel (PSBCH). In some cases, the description may be transmitted in a MasterinformationBlock for Sidelink (MIB-SL) message, an extension of the MIB-SL, or a new message, e.g., a SystemInfomrationBlock1 (SIB1) like message for Sidelink. In yet another example, the description may be transmitted to the second UE in a point-to-point sidelink signaling message, e.g., a Resource Pool Information message, over a Sidelink Shared CHannel (SL-SCH), a Physical Sidelink Shared CHannel (PSSCH) or another sidelink channel.

In some cases, a base station may update the configuration of the pool of ProSe resources. In these or other cases, the first UE may send an updated description to the second UE.

In some cases, a resource pool description can include at least one of an SC period, a Cyclic Prefix length for control and data, Time and Frequency parameters, e.g., subframe bitmap for time resource pattern and resource block pattern, synchronization parameters, power control information, or TDD operation parameter, if applicable.

In some cases, different information elements may be used to indicate different types of resource pools. For example, commTxPoolNormalCommon may be used to indicate a common resource pool, which is used in normal conditions. CommTxPoolExceptional may be used to indicate a pool of resource used in exceptional conditions. Examples of exceptional conditions include physical layer problems or radio link failure. In some cases, the UE may use the resource pool indicated by the commTxPoolExceptional when operating in network scheduled mode. CommTxPoolNormalDedicated may be used to indicate a pool of resources used during Radio Resource Control (RRC) CONNECTED state if configured by the network. In some cases, this pool may be signaled in RRCConnectionReconfiguration by the network when autonomous selection mode is configured.

In some cases, a "finger-printing" mechanism, e.g., mark-up, timestamp, hash-code, or other references, can be used to identify a particular configuration of the pool of ProSe resources. For example, a reference number may be associated with the current pool. The reference number may be broadcast in the MIB-SL. A UE may compare the reference number of the previously acquired pool information with the broadcasted reference number. The UE may request updated pool information if the number is different. This approach may reduce the resources used to transmit the descriptions when the pool has not been changed. In some cases, a timestamp may be used in conjunction with the reference number to avoid using outdated pool configuration.

In some cases, the description may need to be updated if changed by the network during the communication session (an update of the MIB-SL or of the Resource Pool Information message may be sent by the relay).

In some cases, the scheduling information or resource grant may include a frequency hopping flag, a resource blocks assignment for data, a time resource pattern used for data, a Modulation and Coding Scheme (MCS) used for data, a Timing Advance Indication, a Group Destination Id, or a combination thereof. In some cases, the scheduling information may be transmitted using an SCI format 0 or an enhanced SCI format.

In some cases, the scheduling information may be transmitted to the second UE in a sidelink signaling message over PC5, e.g., a Resource Allocation Grant message.

The following is an example of the resource grant message for a sidelink resource.

| ResourceAllocationGrant message |
| --- |
| -- ASN1START<br>ResourceAllocationGrant ::=   SEQUENCE {<br>    sCI-resource-index-r13      INTEGER (0..31),<br>    tPC-command-r13             INTEGER (0..1),<br>    frequencyHopping-r13        INTEGER (0..1),<br>    resourceBlockAss-r13        INTEGER (1..8192),<br>    tRP-index-r13               INTEGER (0..127)<br>}<br>-- ASN1STOP |

| ResourceAllocationRequest field descriptions |
| --- |
| sCI-resource-index |
| Indicates the index to determine the SCI frames for PSCCH transmission. |
| tPC-command |
| Indicates the power control command. |
| frequencyHopping |
| Identifies whether frequency hopping shall be used or not. |
| resourceBlockAss |
| Provides the resource block assignment for the SC period. |
| tRP-index |
| Provides the Time Resource Pattern index for the SC period (FDD). |

At block 212, whether a communication session has ended is determined. In some cases, the scheduling information is valid for an SC period. Therefore, if the session does not end, the process 200 proceeds to block 206, where a new request may be received by the first UE for a new SC period. The process 200 repeats until the communication session ends.

Figure 3:
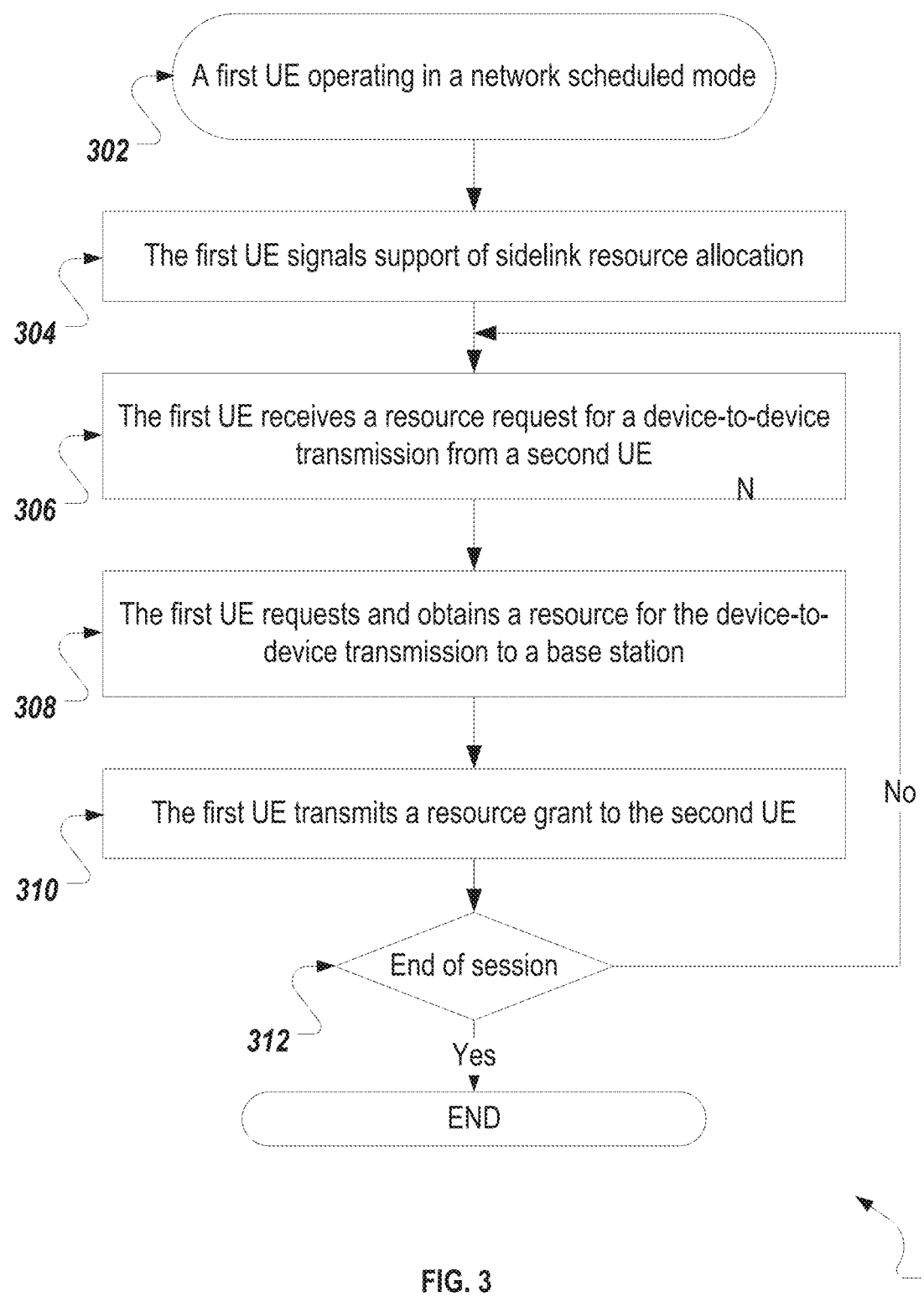
FIG. 3 is a flowchart illustrating an example process for allocating resources in a network scheduled mode.

FIG. 3 is a flowchart illustrating an example process 300 implementing a technique for scheduling resources allocation for remote UEs by a UE operating in a network scheduled mode. This technique may also be referred to as a remote resource allocation, a remote sidelink resource allocation or a remote D2D resource allocation. The process 300 may begin at block 302, where a first UE operates in a network scheduled mode. In some cases, the first UE may be a relay UE that relays D2D transmissions from other UEs to a base station.

At block 304, the first UE signals a resource allocation configuration to other UEs. In some cases, a resource allocation configuration may indicate a remote resource allocation capability. The remote resource allocation capability may instruct or enable other UEs to request D2D resources from the first UE. In some cases, the resource allocation configuration may include information that describes the resource pool for sidelink transmissions. FIG. 4 and associated descriptions provide additional details according to an example implementation.

At block 306, the first UE receives a resource request for one or more device-to-device transmissions from a second UE. In some cases, the second UE may be a remote UE. In some cases, the second UE may be a UE that is within a network coverage.

Figure 9:
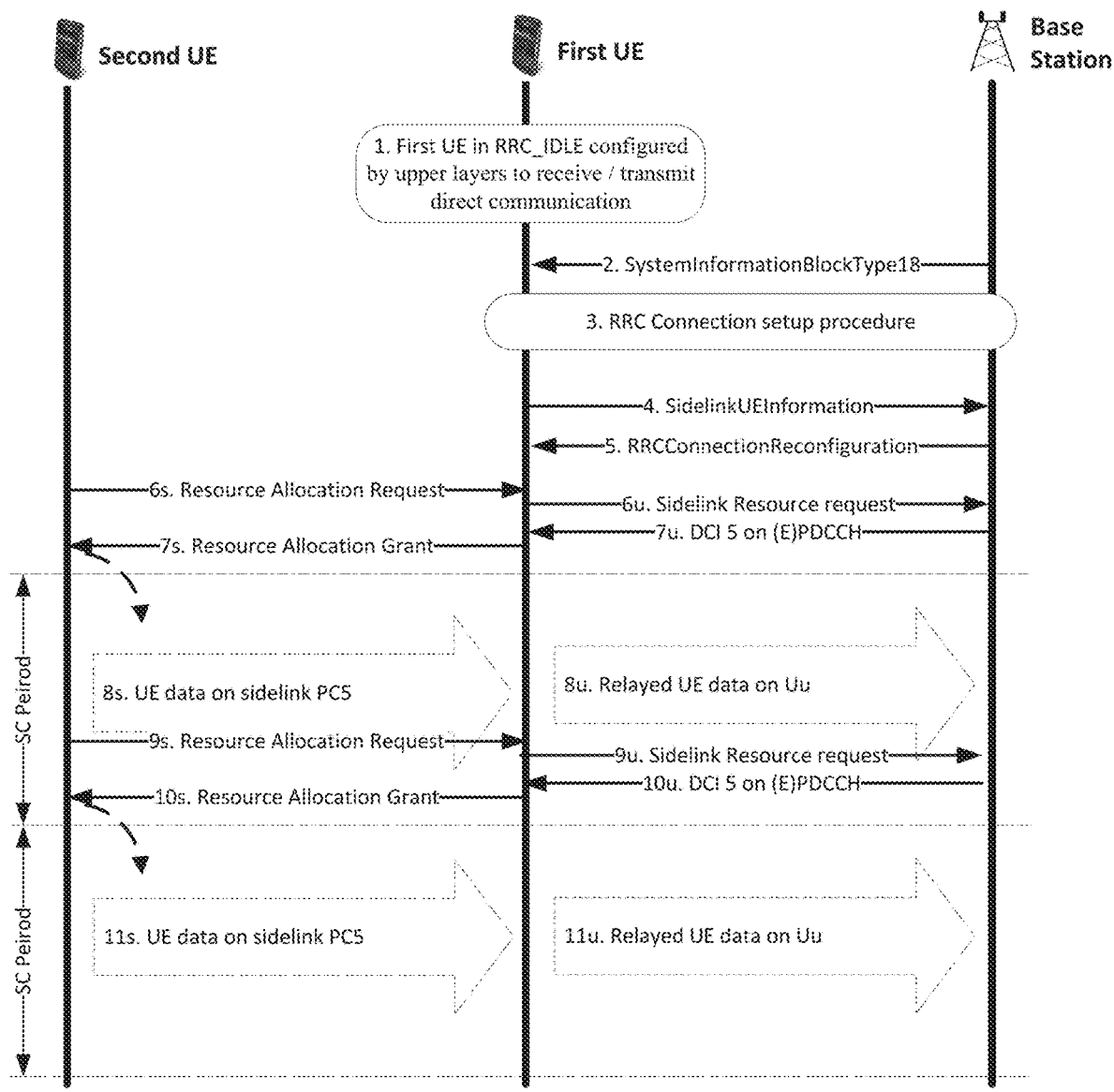
FIG. 9 is a message flow diagram illustrating an example resource allocation process for a UE that operates in a network scheduled mode.

At block 308, the first UE requests and obtains a resource for the D2D transmissions. In some cases, the first UE requests and obtains the resource from a base station. FIG. 9 and associated descriptions provide additional details according to an example implementation.

At block 310, the first UE transmits a resource grant to the second UE. The resource grant can be used by the second UE to identify the resource for the D2D transmissions. In some cases, the second UE may use the following two types of information to determine the resources: description of a pool of resources and scheduling information. In some cases, the first UE may forward the description of pool information and the scheduling information received from the base station to the second UE. In some cases, the first UE may forward the description of pool information to the second UE as a resource allocation configuration.

At block 312, whether a communication session has ended is determined. In some cases, the scheduling information is valid for an SC period. Therefore, if the session does not end, the process 300 proceeds to block 306, where a new request may be received by the first UE for a new SC period. The process 300 repeats until the communication session ends.

FIG. 4 is a message flow diagram illustrating an example process 400 for transmitting a resource allocation configuration. As discussed previously, in some cases, the first UE can transmit a resource allocation configuration to indicate a remote sidelink resource allocation capability. In some cases, the capability can be transmitted as relay information or relay status over a sidelink channel during a relay discovery or relay selection procedure or in an MIB-SL broadcast by the relay UE over PSBCH. In some cases, the MIB-SL may be transmitted periodically, e.g., with a 40 milliseconds periodicity.

In some cases, the first UE may determine whether to turn on the resource allocation techniques described in FIGS. 2-3 and associated descriptions. The first UE may set the remote sidelink resource allocation capability indicator to "1" if the first UE determines to use the technique. Alternatively or in combination, the first UE may set the capability indicator to "0." If the capability indicator is set to "0," other UEs may not request sidelink resources from the first UE. Instead, other UEs may select the resources by themselves if operating in the autonomous selection mode, or request resources from a base station if operating in the network scheduled mode.

In some cases, the first UE may determine whether to turn on the resource allocation technique described in FIGS. 2-3 and associated descriptions, depending on the mode, e.g., the autonomous selection mode or the network scheduled mode, that the first UE operates in. In some cases, the first UE may signal to the second UE the mode, e.g., the autonomous selection mode or the network scheduled mode, that the first UE operates in and the capability of any resource allocation technique described in FIGS. 2-3 and associated descriptions, and the second UE may determine whether to use or not the corresponding resource allocation technique (e.g. depending on transmission latency requirements).

In some cases, the resource allocation configuration signaling may be omitted. For example, the support for the remote resource allocation technique may be mandatory for a relay UE. Therefore, a remote UE may request resources from a relay UE without receiving the resource allocation configuration.

Referring to FIG. 4, the process 400 begins at 402, where the relay UE broadcasts an indication on the PSBCH to signal the support of resource allocation to remote UEs. At 404, the relay UE repeats the indication in 40 milliseconds. At 406, the remote UE 1 and the relay UE initiate resource allocation for sidelink transmissions.

Figure 5:
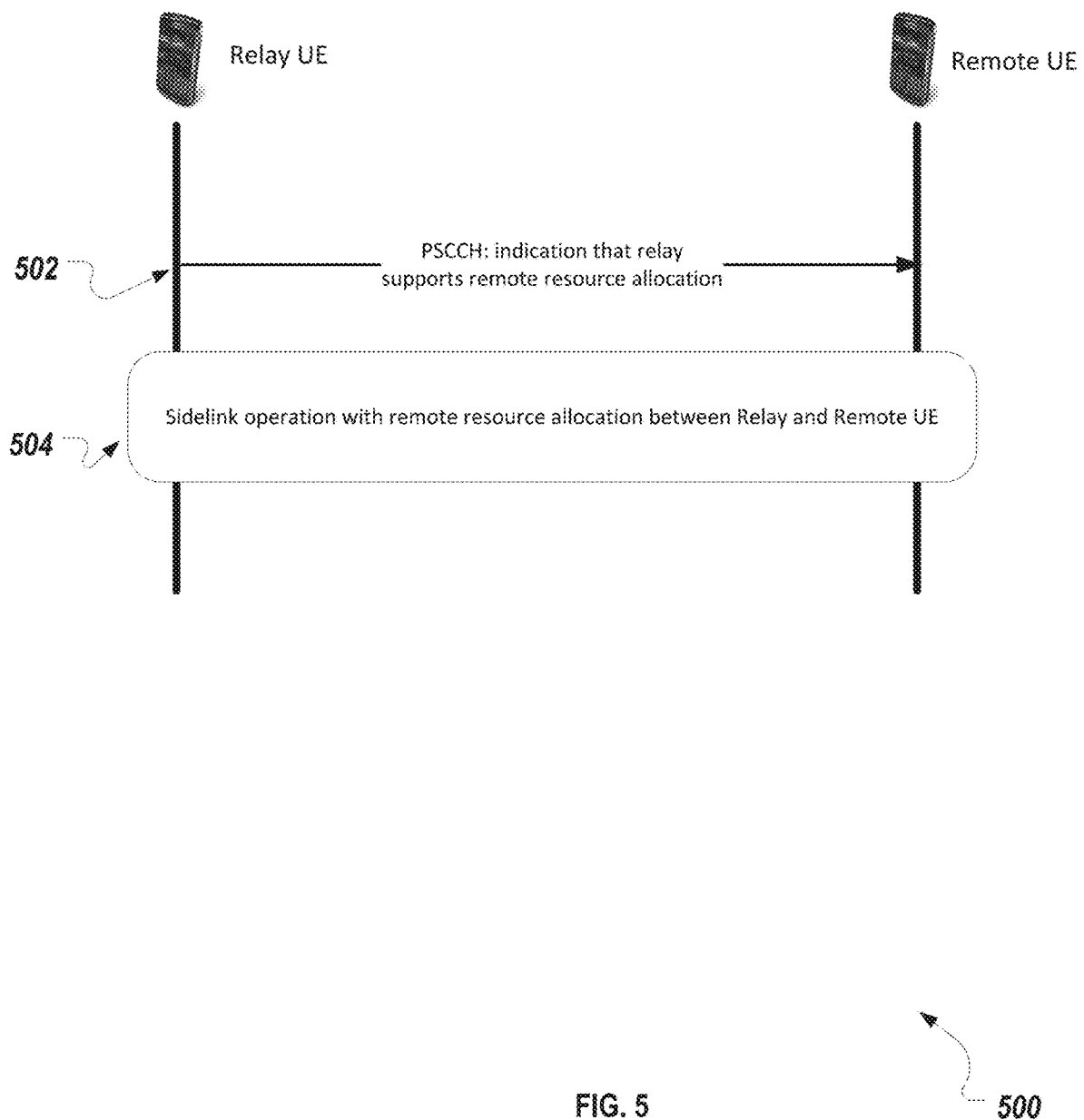
FIG. 5 is a message flow diagram illustrating another example process for transmitting a resource allocation configuration.

FIG. 5 is a message flow diagram illustrating another example process 500 to signal the support by the relay UE of resource allocation to remote UEs. The process 500 begins at 502, where the relay UE transmits the resource allocation configuration to a remote UE over a PSCCH. The resource allocation configuration indicates that the relay UE supports sidelink resource allocation. Alternatively or in combination, the resource allocation configuration can be transmitted over a PSSCH. In some cases, the resource allocation configuration may be transmitted in a one-to-one transmission between the relay UE and the remote UE. Alternatively or in combination, the resource allocation configuration may be transmitted in a one-to-many transmission between the relay UE and multiple remote UEs. At 504, the remote UE and the relay UE initiate resource allocation for sidelink transmissions.

FIG. 6 is a flowchart diagram illustrating an example resource selection process 600. The process 600 may begin at 602, where the first UE determines that a resource needs to be selected. The determination may be triggered by a resource request from a second UE as described previously.

At 604, the first UE may select a resource from a pool of resources for the sidelink transmission. The resource may include an SCI resource for the SCI transmission and the time and frequency resources for the sidelink data transmission. As discussed previously, in some cases, the pool of resources may be configured by the base station. Alternatively or in combination, the pool of resources may be pre-configured at the first UE, the second UE, or a combination thereof. The pool of resources may include an SCI resource pool for SCI transmission and a data resource pool for sidelink data transmission.

In some cases, the first UE may select orthogonal (non-colliding) resources with other assigned sidelink resources. In some cases, other assigned sidelink resources may include resources assigned by the first UE for sidelink transmissions from the first UE, resources assigned by the first UE for sidelink transmissions from one or more second UEs, or resources assigned by other UEs that the first UE is aware of. For example, the first UE may exclude the SCI resource already selected for the considered SC period and randomly select an SCI transmission resource from the not yet selected SCI resources in the SCI resource pool.

In the illustrated example, the first UE may determine the timing resource information for the sidelink data transmission before the frequency resource information. In some cases, the timing resource information may include a load value parameter, $K_{TRP}$ for a time resource pattern (TRP). $K_{TRP}$ represents a number of allocated subframes within a configured number of subframes. In one example, the configured number of subframes may be 8. In this or other examples, $K_{TRP}$ may be set to 1, 2, or 4 subframes, indicating that 1, 2, or 4 subframes within the 8 subframes are allocated to a particular sidelink transmission. In some cases, the first UE determines $K_{TRP}$ based on the QoS information received in the resource request, based on a subframe bitmap associated to the resource pool, or based on a combination thereof. For example, if the second UE indicates in the QoS information that a high data rate service or a high buffer size is associated with the request, the first UE may set $K_{TRP}$ to a high number.

The timing information may include a TRP, which may be a bitmap that indicates the subframes of the allocated resource. For example, "10101010" is a TRP, which represents the first, third, fifth, and seventh subframes in an 8-subframe subset. In some cases, the first UE may select the TRP so that it has minimum overlap with TRPs that are assigned to other sidelink transmissions in the SC period. In some cases, the TRP can be represented as $I_{TRP}$, which may be an index to the TRP. For example, $I_{TRP}$ may be set to 56 to indicate the "10101010" TRP.

In some cases, the first UE may select the resource to minimize collisions with other assigned resources. For example, the first UE may select a TRP based on a collision distance between this TRP and the already assigned TRPs. The first UE may calculate the hamming distances between the candidate TRPs for the second UE transmissions from a configured pool of sidelink resources and any other assigned TRP for the considered SC period. The first UE may select among the candidate TRPs the TRP that has a highest hamming distance with any other assigned TRP.

At 606, the first UE may select a frequency resource for the sidelink data transmission. In some cases, the first UE may select the resource blocks (RBs) that have minimum collision with RBs that are assigned to other sidelink transmissions in the SC period for the subframes included the selected time resource pattern. At 608, the first UE marks the selected resources in both time domain and frequency domain. This approach helps the first UE to keep track of the selected resources and minimize collisions in allocating resources for other sidelink transmissions.

At 610, the first UE indicate the assigned resource, i.e. transmits the resource grant, to the second UE. FIG. 8 and associated descriptions provide additional details of these implementations.

In some cases, the first UE may determine the frequency resource for the sidelink data transmission before the time resource. FIG. 7 is a flowchart illustrating an example frequency-first resource selection process 700. The process 700 may begin at 702, where the first UE determines that a resource needs to be selected. At 704, the first UE may select a resource for the sidelink transmission. As discussed previously, the first UE may exclude the SCI resource already selected by the relay for the same SC period and randomly select an SCI transmission resource from the remaining SCI resource pool.

In the illustrated example, the first UE also determines the frequency resource information for the sidelink data transmission before the time resource information. The first UE may determine the number of RBs based on the QoS information received in the resource request, based on a modulation and coding scheme to be used, or a combination thereof. For example, if the second UE indicates in the QoS information that a high data rate service or a high buffer size is associated with the request, the first UE may determine a high number of RBs. The first UE may also select RBs that have minimum collision with RBs that are assigned to other sidelink transmissions in the same SC period.

At 706, the first UE may select a time resource for the sidelink data transmission. As discussed previously, the first UE may determine $K_{TRP}$ based on the QoS information received in the resource request. The first UE may also select an $I_{TRP}$ such that the corresponding time resource pattern has a minimum collision distance with other assigned time resource patterns. At 708, the first UE marks the selected resources in both time domain and frequency domain to keep track of the selected resources. At 710, the first UE transmits the resource information to the second UE. FIG. 8 and associated descriptions provide additional details of these implementations.

In some cases, e.g., when the first UE is a relay UE operating in the autonomous selection mode, the first UE may also coordinate the sidelink resources selection with other relay UEs in the vicinity which are likely to interfere on its allocated sidelink resources. The other UEs may operate in either the autonomous selection mode or the network scheduled mode. Such coordination may be based on communicating sidelink resource scheduling information (e.g., at least one of frequency resources or time patterns) between these relay UEs, either through sidelink transmission or through the cellular network. This may enable relay UEs in proximity to avoid selecting the colliding resources.

Figure 10:
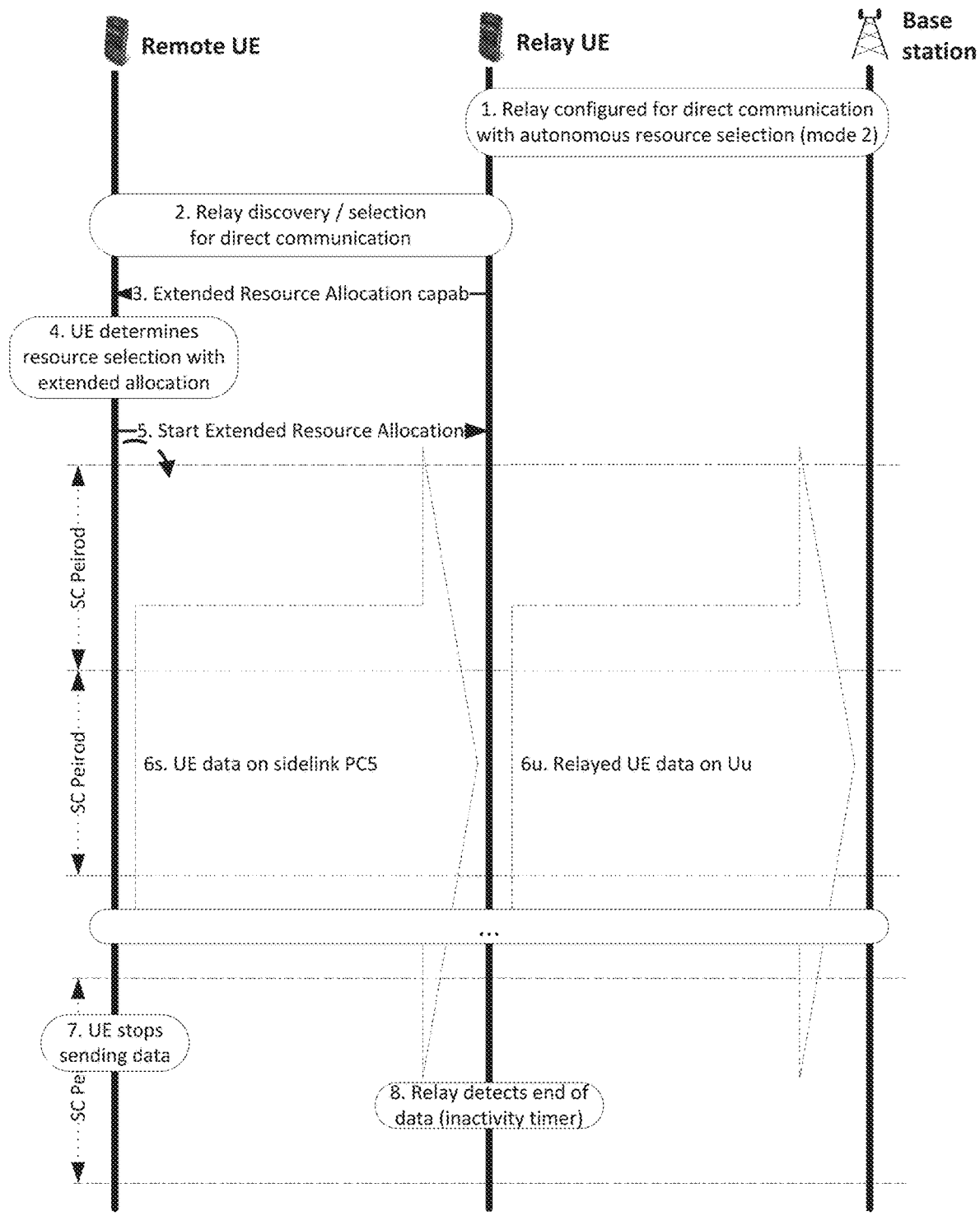
FIG. 10 is a message flow diagram illustrating an example extended period process for a remote UE operating in an autonomous selection mode.
Figure 11:
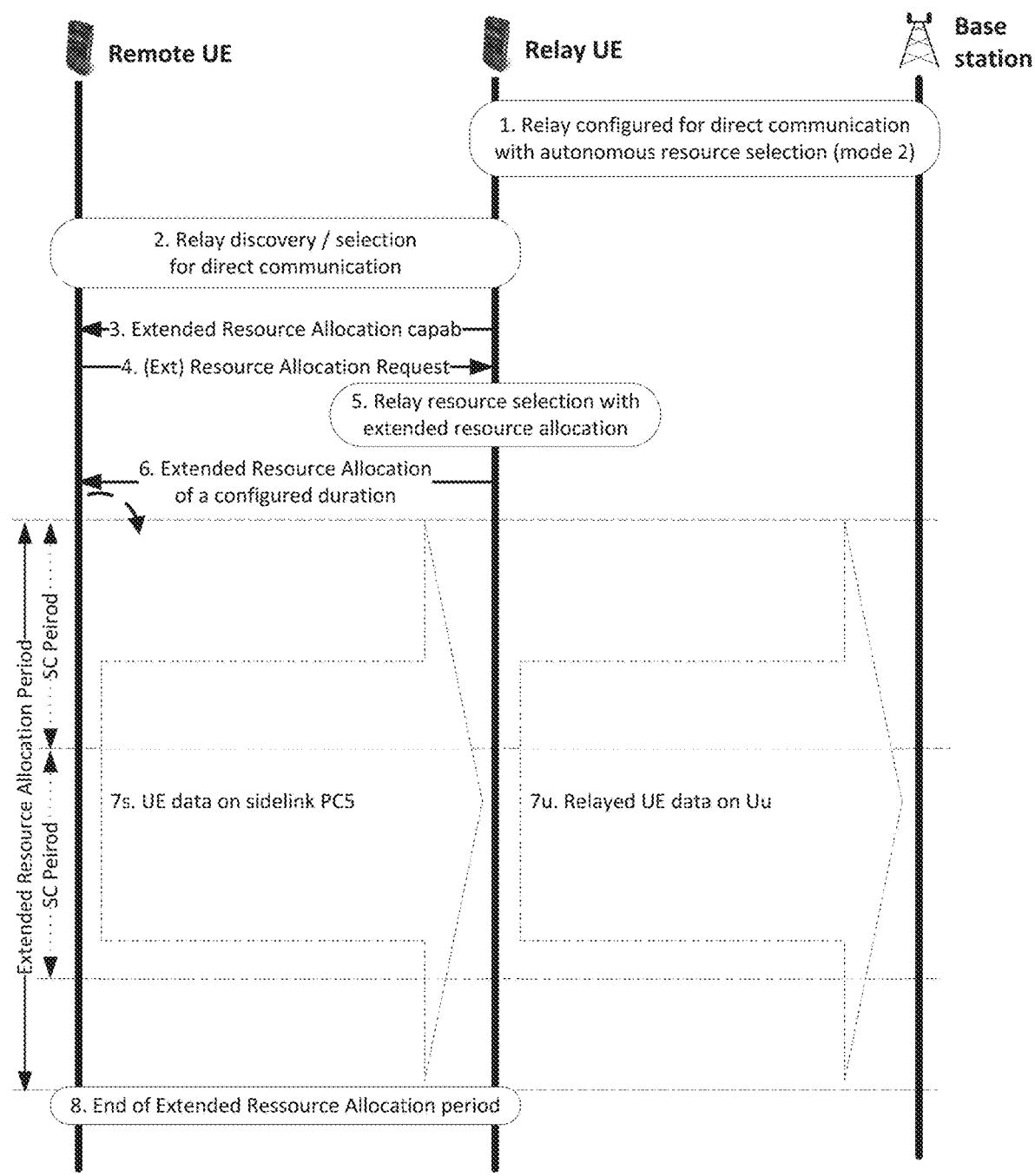
FIG. 11 is a message flow diagram illustrating an example extended period process for a relay UE operating in an autonomous selection mode and scheduling resource allocation for remote UEs.
Figure 12:
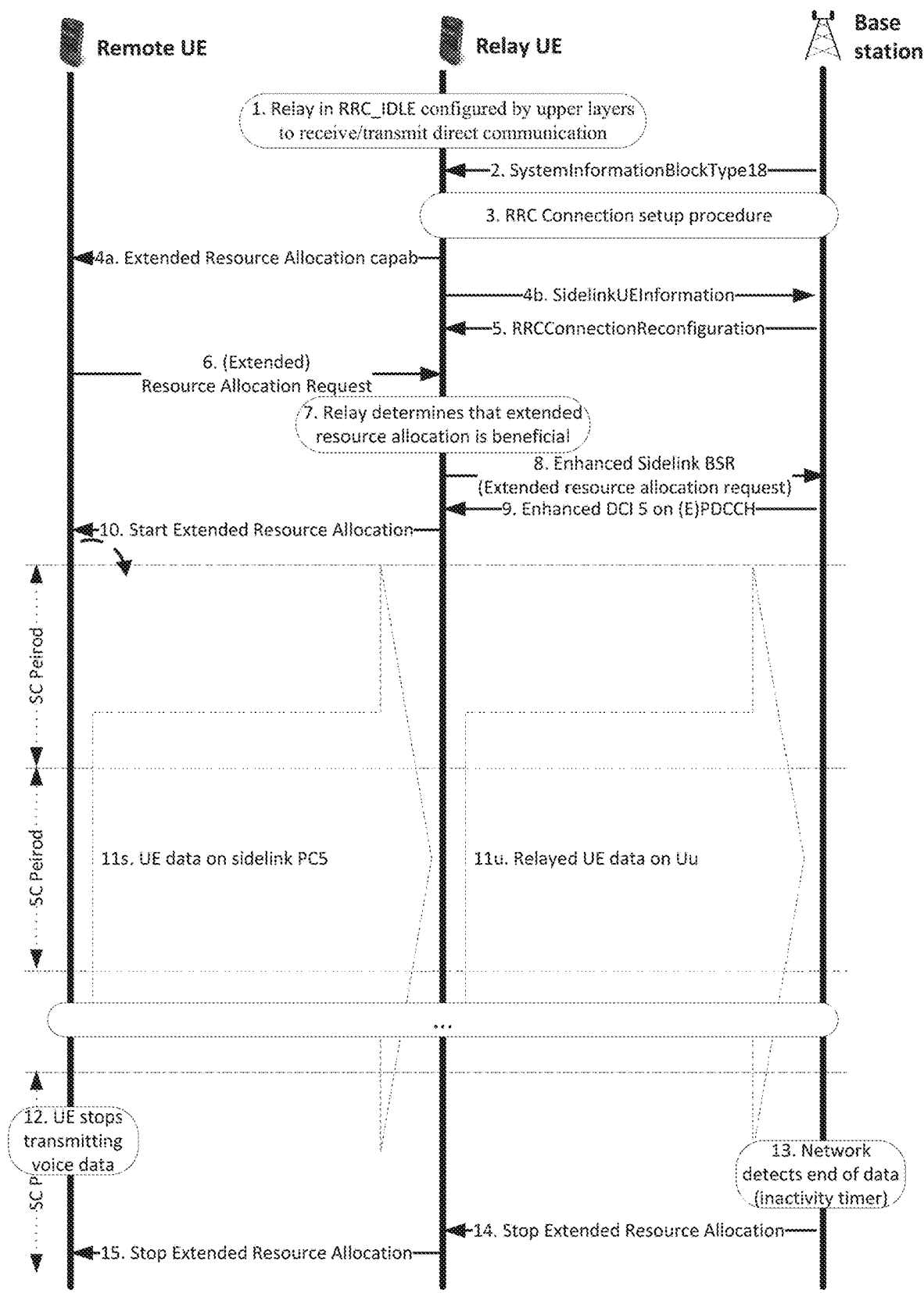
FIG. 12 is a message flow diagram illustrating an example extended period process for a relay UE operating in a network scheduled mode and scheduling resource allocation for remote UEs.

In some cases, the coordination between the relay UEs may be used in combination with extended sidelink resource allocation as discussed in FIG. 10-12. This approach may reduce overhead for the coordination.

To coordinate the sidelink resource allocation, the relay UEs may exchange the identification of the resource pool(s) used by the relay, the description of the pool, the description of the sidelink resource selected by the relay UE, or a combination thereof.

In some cases, the coordination information may be exchanged using at least one of a broadcast, a multicast or a point-to-point transmission between relay UEs over a PC5 interface. In some cases, the cellular network may store and forward the coordination information to the relay UEs. For example, the cellular network may forward the identity of the relay UEs and the pool information associated to each relay UEs.

In some cases, a relay UE may notify a target relay UE or the cellular network for sidelink resource usage information. In some cases, a target relay UE may be another relay UE that is in proximity with the relay UE. The relay UE may include relevant pool information as described above. The target relay UE or the network may store the request and the relay UE identity. The target relay UE or the network may reply to or inform the relay UE with the relevant pool information used by the target relay UE.

In some cases, the relay UE may signal the sidelink resource allocation information to target relay UEs. In some cases, the sidelink resources information may be communicated before the start of each SC period or an extended resource allocation period as discussed in FIG. 10-12. In some cases, the sidelink resource information may be transmitted directly over the PC5 interface instead of through a network path to avoid additional delays.

In some cases, a relay UE receiving information about resource usage by target relay UEs may take this information into account for allocating sidelink resources. For example, the relay UE may avoid using these resources when selecting resources for sidelink transmissions.

In some cases, instead of receiving the resource usages by target relay UEs over PC5 interface or through a network, the relay UE may decode the PSCCH of neighboring sidelink transmitters and obtain the usage information.

FIG. 8 is a message flow diagram illustrating an example resource allocation process 800 for a UE that operates in autonomous selection mode according to the technique described in FIG. 2 and associated description. As illustrated, process 800 may begin at step 1, where the first UE receives configuration information for a resource pool from the base station. At step 2, the first UE may be selected as a relay UE serving the second UE and indicates that it supports resource allocation according to the designated technique. At step 3, the second UE sends a resource allocation request. At step 4, the first UE selects a resource. At step 5, the first UE sends a resource allocation grant to the second UE. The resource allocation grant indicates the resource for the sidelink transmission. At step 6s, the second UE uses the resource indicated in the resource allocation grant to transmit over the PC5 interface. At step 6u, the first UE relays the data to the base station over the Uu interface. As discussed previously, the resource allocation grant may be valid for an SC period. Therefore, as illustrated, in the next SC period, the first and second UE repeat the scheduling requests and transmission procedures in steps 7 to 10u.

FIG. 9 is a message flow diagram illustrating an example resource allocation process 900 for a UE that operates in network scheduled mode according to the technique described in FIG. 3 and associated description. In the illustrated example, the first UE may request sidelink scheduled resources from the network.

In some cases, the requested resources may indicate the aggregated sidelink data traffic generated by the first and the second UE(s). In these or other cases, the first UE may indicate the size of the aggregated data to a base station in a sidelink BSR. In some cases, multiple uplink or downlink data flows may be served by a first UE for the same group in a given SC period. In these or other cases, the first UE may then share the granted resources among the different flows.

In some cases, the first UE may indicate resource requests for each individual sidelink traffic flow to the network by transmitting buffer size information associated with each logical channel group (LCG) in the sidelink BSR. For example, the transmissions from a relay UE to multiple remote UEs may be mapped to one LCG and the transmissions from each remote UE to the relay UE may be mapped to a respective LCG In some cases, the mapping may reflect the relative priorities of these different traffic flows. For instance, the transmissions from the relay to the remote UEs may be mapped to a higher priority LCG while the traffic from the remote UEs to the relay may be mapped to a lower priority LCG In these or other examples, the relay UE may calculate the buffer size for each LCG independently and populate the sidelink BSR with the calculated buffer size for each LCG.

In some cases, a base station operating in a Frequency Division Multiplex (FDD) mode may avoid scheduling uplink Uu transmissions, or reduce the number of uplink Uu transmissions and retransmissions, in the subframes allocated for sidelink transmissions. This approach may reduce collisions of the sidelink transmission with other uplink transmissions in the coverage area of the base station. Similarly, a base station operating in a Time Division Multiplex (TDD) may avoid scheduling uplink and downlink Uu transmissions or reduce the number of Uu transmissions in the subframes allocated for sidelink transmissions to reduce collisions.

The process 900 may begin at step 1, where the first UE is configured for D2D transmissions. At step 2, the first UE receives a System Information Block (SIB) message from the base station. At step 3, the first UE enters into RRC CONNECTED state. At step 4, the first UE transmits sidelink UE information to the base station. At step 5, the first UE receives an RRC connection reconfiguration message from the base station. In some cases, the first UE may transition to the RRC IDLE state. At step 6s, the first UE receives a resource allocation request from the second UE. In some cases, the first UE may have entered the RRC CONNECTED state in advance of receiving the resource allocation request. In some cases, the resource allocation request may trigger the first UE to transition into the RRC CONNECTED state.

At step 6u, the first UE sends a sidelink resource request to the base station. In some cases, the sidelink resource request may be a resource request for D2D transmission. In some cases, the sidelink resource request may be a scheduling request. In some cases, the sidelink resource request may be a BSR. As discussed previously, in some cases, the sidelink BSR may include the buffer size of the sidelink resources required by the second UE. Alternatively or in combination, the sidelink BSR may include aggregated buffer size of the sidelink resources required by multiple UEs. At step 7u, the base station sends the sidelink allocation information to the first UE. In some cases, the sidelink allocation information may be a sidelink resource grant. In some cases, the sidelink allocation information may be a resource allocation for D2D transmission. In some cases, the sidelink allocation information is transmitted using a DCI format 5 or an enhanced DCI format over a Physical Downlink Control Channel (PDCCH) or an enhanced PDCCH (EPDCCH). At step 7s, the first UE sends a resource allocation grant to the second UE. The resource allocation grant indicates the resource for the sidelink transmission based on the sidelink allocation information received from the base station at step 7u. At step 8s, the second UE uses the resource indicated in the resource allocation grant to transmit over the PC5 interface. At step 8u, the first UE relays the data to the base station over the Uu interface.

As discussed previously, the sidelink allocation information may be valid for an SC period. Therefore, as illustrated, in the next SC period, the resource allocation procedures are repeated in steps 9s to 11u.

In some cases, the first UE may transmit the related pool information to the second UE at the start of the direct communication session. In some cases, the first UE may transmit the pool information, e.g., commTxPoolExceptional, to the second UE when an exceptional case occurs or in advance to such an event. In some cases, the same techniques as (or techniques similar to) the techniques described previously to signal pools to be used in normal condition can be used.

In some cases, the overhead associated with the resource requests and resource grants may be minimized to reduce overheads. In one example, the base station may configure a transmission pool specific for sidelink transmissions between a first UE and other UEs connected to the first UE over a PC5 interface or a sidelink transmission link. In some cases, the first UE may be a relay UE and the other UEs are one or more remote UEs. The Configuration information of this pool may be communicated to the first UE in an RRCConnectionReconfiguration message or other RRC messages. The resources of a single pool may be shared between the first UEs and other UE(s) for their sidelink transmissions. The base station may avoid scheduling Uu transmissions in the subframes allocated in this pool. For example, the base station in LTE FDD operation may avoid scheduling uplink transmissions or reduce the number of uplink transmissions and retransmissions in the subframes in the transmission pool in order to reduce probability of collisions between uplink (re)transmissions and sidelink transmissions below a certain level in case the uplink and the sidelink transmissions use the same frequency or cause interference to each other. The eNB in LTE TDD operation may avoid scheduling uplink and downlink transmissions or reduce the number of uplink and downlink transmissions and retransmissions in the subframes in the transmission pool in order to reduce the probability of collisions between uplink and downlink (re)transmissions and sidelink transmissions below a certain level in case the uplink, downlink and the sidelink transmissions use the same frequency or cause interference to each other. The first UE may split the resource pool in two or more subsets, a first subset to be used by the first UE and a second or more subsets to be used by other UEs. The first UE may indicate the configuration information of the second or more subsets of sidelink resources (SCI and data resources) to the other UEs. For example, considering a first UE and a second UE operating in autonomous selection mode, the first UE and the second UE may each select a subframe for SCI transmission randomly from the configured SC pool. If both UEs share a SC pool consisting of 8 subframes and have data to transmit in a next SC period, the probability of collision is 8/(8*8)=1/8 which is significantly high and may disrupt subsequent data transmissions in the SC period. If the first UE and the second UEs are configured with non-overlapping SC pool subsets, the collision probability is reduced to zero. Alternatively, the two subsets may overlap in certain amount to keep the collision probability below a certain level. For example, if 2 out of 8 subframes overlap then the collision probability is 2/64=1/32. Please note that use of subsets of configured resource pool can be also applicable to data pool to avoid or reduce probability of collisions. Alternatively or in combination, the base station may configure two or more subsets of sidelink transmission resources: the first subset for the first UE and the second or more subsets for the other UEs. The base station may indicate the configuration information of these subsets of transmission resources to the first UE and the first UE may configure the other UEs to use the second or more subsets. In these or other examples, the other UEs may select a resource in the second subset to perform a D2D transmission without sending a resource request and waiting for a resource grant.

In some cases, the traffic characteristics of the sidelink transmissions may be semi-static, e.g., in a voice communication. In these or other cases, the resource grants discussed previously may be transmitted in a reduced format to reduce overheads. In some cases, a resource pool may be preconfigured at the second UE. In these or other cases, the first UE may not send configuration information of a resource pool to the second UE. Furthermore, the first UE may send the resource grant in a reduced format. For example, the resource grant may include only a time resource pattern. The second UE can determine the sidelink resource for D2D transmissions by the second UE in the preconfigured pool based on the time resource pattern received from the first UE.

In some cases, one or more time resource patterns may be semi-statically configured. For example, a second UE may store one or more preconfigured time resource patterns. In some cases, different patterns may be configured in different UEs of the same group to reduce potential collisions. In some cases, the patterns may be configured based on the service type or QoS information associated to the D2D transmission at the second UE. In these or other cases, the second UE may use the preconfigured time resource patterns without receiving the patterns from the first UE.

In some cases, the second UE may select a resource to transmit sidelink transmissions in a preconfigured pool without sending a request for sidelink resource to the first UE, but the first UE may be able to control the resource selection by the second UE. In these or other cases, the first UE may control or overwrite the preconfigured pool configuration information. In these or other cases, the first UE may send a resource grant in a reduced format. The resource grant may include a time resource pattern, an SC period, a subframe bitmap, or a pool offset to be used by the second UE to reduce collisions.

In some cases, the second UE may signal to the first UE the relevant information on its preconfigured transmission pool. The first UE may take this information into account when scheduling its transmissions to reduce collisions, e.g., on the PC5 interface and between the PC5 and the Uu interfaces. The preconfigured sidelink transmission resource pool information used by the second UE may be further shared with the base station for coordinating resource usage between the base station, the first UE, and other UEs.

In some cases, an extended period may be used for sidelink resource allocation. The extended period may be used to extend the validity of a resource allocation beyond an SC period. Extending the validity of the sidelink resource allocation may reduce signaling overhead, in particular for conversational bearer types, e.g., bearers for voice communication, because the associated transmission resources needs are typically uniform and easy to predict.

In some cases, the extended period may be used for either direction of a sidelink transmission between a first UE and a second UE. In some cases, the extended period may be used when the first UE operates in either the autonomous selection mode or the network scheduled mode. In some cases, the extended allocation period may be used in combination to the techniques described in FIGS. 2-3 and associated descriptions, or in combination with other techniques described in the present disclosure. In some cases, the extended period may be used for downlink data received at the first UE from the network via an Evolved Packet System (EPS) unicast bearer, a Multicast Broadcast (MBMS) multicast bearer, or a Single Cell Point-to-Multipoint (SC-PTM) multicast bearer. In some cases, the first UE may be a relay UE, while the second or other UEs may be remote UEs.

In some cases, whether the extended period may be used may depend on several factors. The factors may include the QoS information. For example, the extended period may be used if QCI is set to 65, which indicates an MCPTT voice service. The factors may also include the duration of the configured SC period. For example, if the SC period is set to a short period, e.g., 40 or 80 ms, then extended period may be used. The factors may also include the expected duration of a signaling procedure or of a sequence of signaling procedures. For example, if a UE is attempting to establish a Network Mode Operation via Relay (NMO-R) for an MCPTT direct communication session, the signaling procedure may take longer than the SC period and the extended period may be used.

In some cases, a second UE may request resources to a first UE, a first UE may grant resources to the second UE, a first UE may request resources to a base station, and/or a base station may schedule resources for a first or a second UE. In some cases, at least one of a first UE, a second UE, or a base station may indicate a capability to support the extended period. For example, a second UE may indicate its support of the extended period to the first UE. This capability may be provided during the connection establishment phase to the first UE or may be indicated implicitly or explicitly in the resource request. The first UE may indicate its support of the extended period to the second UE in a resource allocation configuration. The first UE may also indicate its capability to the base station explicitly or implicitly in an extended or enhanced sidelink BSR. The base station may indicate its support of the extended period using an indication in an SIB, for example a SIB Type 18. Alternatively, this capability may be indicated in point-to-point RRC messages involved in D2D communications procedures, e.g., an RRC Connection Reconfiguration message.

In some cases, a single capability indicator may be used. In some cases, different capability indicators may be used for reception and transmission, respectively.

In some cases, techniques ensuring the compatibility between an equipment supporting an extended period and another equipment not supporting or not using an extended period may be operated. For example, if a UE sends a request for an extended resource allocation period and receives a non-extended grant, the UE may interpret that the extended period is not used.

In some cases, a second UE may include an explicit indication for the extended period in a resource request. Alternatively or in combination, a request for the extended period may be transmitted implicitly as part of the QoS information in the resource request.

In some cases, the duration of the extended resource allocation period may be signaled explicitly, e.g., as an absolute period of time, or as a multiple of the configured SC period. Alternatively or in combination, the extended resource period may be an undetermined duration. For example, the extended period may persist until an indication is received. In some cases, the indication may be a "stop" indication. In some cases, the indication may be an indication that the extended resource allocation becomes invalid.

In some cases, the duration indication of the extended resource allocation period may be indicated in an enhanced SCI format 0 over a PSCCH, or in a dedicated point-to-point signaling message over a PSSCH. In some cases, the first UE, e.g., a relay UE, may multicast the duration indication in the MIB-SL message on a PSBCH. In some cases, one or more default duration values may be specified, e.g., in a 3GPP standard. In some cases, the default duration values may be associated to types of bearers, e.g., voice or PTT bearer types, or related QoS information.

In some cases, the extended resource allocation period may start upon reception of an extended resource allocation period indication in an enhanced SCI format 0 or point-to-point signaling message. In some cases, the extended resource allocation period may start implicitly if the associated bearer type is activated. In some cases, an extended resource allocation period may start upon the reception of an indication in an enhanced SCI format 0 over a PSCCH or in a dedicated point-to-point signaling message. In some cases, the indication may be a "start" indication. In some cases, the indication may be an indication that an extended resource allocation becomes valid. In some cases, an extended resource allocation period may end upon the reception of an indication in an enhanced SCI format 0 over a PSCCH or in a dedicated point-to-point signaling message. In some cases, the indication may be a "stop" indication. In some cases, the indication may be an indication that the extended resource allocation becomes invalid. The "stop" indication, or the indication that the extended resource allocation becomes invalid, may be used when the extended period has started implicitly, e.g. associated to a type of bearer, or explicitly, e.g., upon reception of a duration indication or of a "start" indication.

In some cases, an extended resource allocation period may start immediately upon reception of an indication, e.g., a duration indication or a "start" indication. Alternatively or in combination, an extended resource allocation period may start at a specific time, e.g., at the beginning of the next SC period.

In some cases, the extended resource allocation period may end upon the expiry of an inactivity timer or upon a reconfiguration of the transmission pool. The inactivity timer may be started when no data is available for sending at the transmitter or no data is received in the assigned resources at the receiver. When the inactivity timer expires, the corresponding resource may be implicitly considered as invalid or released for the concerned session and can be reallocated to another session.

In some cases, a request for an extended resource allocation or for an extended configured grant may be provided to the base station through an extended resource allocation request indicator in an enhanced BSR, a time period duration indication, or a combination thereof. The absence of a time period duration in the request from the first UE may signify that the network should determine the extended period, that the period duration is a default value possibly associated to a given bearer type or QoS, or that the extended period should be indefinite.

In reply, the base station may grant the requested resource for an extended period of time. The granted period may be period indicated by the first UE in the request to the base station, a different period determined by the base station, or an indefinite period.

In some cases, the base station may be aware that the first UE supports the extended resource allocation technique, e.g., via UE capability. In this case, the network may determine and allocate resources with an extended validity time period without receiving a request for an extended period. In some cases, the decision to grant the extended period may be based on QoS information associated to the requested resource.

The base station may signal to the first UE the extended resource allocation using an enhanced DCI format 5 over PDCCH or EPDCCH over the Uu interface.

The first UE may further request the release of the extended resource allocation, e.g., at the end of a talk burst from a second UE. In some cases, the extended resource allocation may be released when the requested, the granted or the default extended period duration expires. Alternatively, the network may explicitly terminate the extended resource allocation period using a normal or enhanced DCI format 5 or a RRC message.

In some cases, the end of the extended resource allocation period may be conditioned by an inactivity timer. The timer may be started when no data is available for sending at the transmitter or no data is received in the assigned resources at the receiver. When the inactivity timer expires, the corresponding resource may be implicitly considered as released for the concerned session and can be reallocated for another session.

FIG. 10 is a message flow diagram illustrating an example extended resource allocation period process 1000 for a remote UE operating in the autonomous selection mode. In the illustrated example, the extended period is initiated by a "start" indication and terminated based on an inactivity timer at the relay UE. The process 1000 begins at step 1, where the base station indicates that the autonomous selection mode is used for sidelink transmission. At step 2, the remote UE discovers and selects the relay UE for D2D transmission. At step 3, the relay UE transmits the extended resource allocation capability, which indicates the support of the extended resource allocation period technique. At step 4, the remote UE selects a resource for the sidelink transmission and determines to use extended allocation for the selected resource. In some cases, the remote UE determines to apply the extended resource allocation period based on the QoS information associated with the bearer type of the sidelink transmission. At step 5, the remote UE transmits a "start" indication, which indicates that it will use extended resource allocation. At step 6s, the remote UE transmits on the PC5 interface using the resources allocated for an extended period that extends beyond an SC period. At step 6u, relay UE relays the transmission to the base station. At step 7, the remote UE completes the transmission and stops sending data. This triggers the inactivity timer at the relay UE. At step 8, the timer expires, and the relay UE determines that the extended resource is released.

FIG. 11 is a message flow diagram illustrating an example extended resource allocation period process 1100 for a relay UE operating in the autonomous selection mode and scheduling resource allocation for remote UEs according to the technique described in FIG. 2 and associated description. In the illustrated example, the extended period is configured by the relay UE. The process 1100 begins at step 1, where the base station indicates that the autonomous selection mode is used for sidelink transmission. At step 2, the remote UE discovers and selects the relay UE for D2D transmission. At step 3, the relay UE transmits the extended resource allocation capability, which indicates the support of the extended resource allocation period technique. At step 4, the remote UE transmits a resource request to the relay UE. At step 5, the relay UE selects a resource for the sidelink transmission and determines to use extended allocation for the selected resource. In some cases, the relay UE determines to apply the extended resource allocation period based on an explicit indication in the resource request. Alternatively or in combination, the relay UE determines to apply the extended resource allocation period based on the QoS information in the request. At step 6, the relay UE transmits an extended resource allocation. The extended resource allocation includes a configured duration for which the resource allocation is valid. At step 7s, the remote UE transmits on the PC5 interface using the resources allocated for an extended period that extends beyond an SC period. At step 7u, the relay UE relays the transmission to the base station. At step 8, the extended period ends, and the allocated resource is no longer valid.

FIG. 12 is a message flow diagram illustrating an example extended resource allocation period process 1200 for a relay UE operating in the network scheduled mode and scheduling resource allocation for remote UEs according to the technique described in FIG. 3 and associated description. In the illustrated example, the extended period is initiated by a "start" indication and terminated by a "stop" indication. The process 1200 begins at step 1, where the relay UE operates in RRC IDLE mode. At step 2, the relay UE receives SIB 18 from the base station. At step 3, the relay UE enters into RRC CONNECTED state with the base station. At step 4*a*, the relay UE transmits the extended resource allocation capability, which indicates the support of the extended resource allocation period technique. At step 4*b*, the relay UE transmits sidelink UE information to the base station. At step 5, the base station transmits an RRC connection reconfiguration message to the relay UE.

At step 6, the remote UE transmits an extended resource request to the relay UE. At step 7, the relay UE determines to use extended allocation for the requested resource. In some cases, the relay UE determines to apply the extended resource allocation period based on an explicit indication in the resource request. Alternatively or in combination, the relay UE determines to apply the extended resource allocation period based on the QoS information in the request. At step 8, the relay UE transmits an enhanced sidelink BSR, an extended resource allocation request, or a combination thereof to the base station to indicate a request for extended resource allocation. At step 9, the base station grants the extended resource and indicates the resource over a PDCCH or an EPDCCH using an enhanced DCI format 5. At step 10, the relay UE transmits an extended resource allocation. The extended resource allocation includes a "start" indication for an extended period. At step 11*s*, the remote UE transmits on the PC5 interface using the resources allocated for an extended period that extends beyond an SC period. At step 11*u*, the relay UE relays the transmission to the base station. At step 12, the remote UE stops the transmitting. At step 13, the network detects end of data transmission based on the expiration of an inactivity timer. At step 14, the base station transmits a "stop" indication to indicate that the extended period has ended. At step 15, the relay UE transmits a "stop" indication to indicate that the extended has ended and the allocated resource is no longer valid.

In some cases, the sidelink transmission over the PC5 interface and the uplink or downlink transmission over the Uu interface may be coordinated to reduce interferences. For example, in a downlink voice traffic, the relay UE may receive a Radio Link Control (RLC) Unacknowledged Mode Data (UMD) Protocol Data Unit (PDU) every 20 milliseconds for regular voice frames or 40 milliseconds for bundled voice frames from the base station. In some cases, the relay UE may determine that the downlink PDUs arrival is periodical with a limited range of jitter based on periodicity of data or on a semi-persistent scheduling (SPS) configuration. The relay UE may select a TRP for sidelink transmission from the second UE that minimizes the latency at the relay UE. The selection of the TRP may also take into account the structure of the resource pool and the processing delay needed for the relay to forward the frames between the Uu and the PC5 interfaces.

The relay UE may signal to the remote UE the selected TRP via SCI format 0. The relay UE may also determine that the selected TRP can be used for an extended resource allocation period and indicate the TRP in an extended sidelink resource grant via an extended SCI format 0.

Similarly, the base station may determine that the arrival of downlink packets destined to the relevant group is periodical with a limited range of jitter. The base station may select an appropriate TRP for the sidelink transmissions from the relay and signal sidelink resource assignment over the Uu interface accordingly via DCI format 5. The selection of the TRP may take into account the scheduling timing of the downlink RLC PDUs over the Uu interface and the processing time of the relay UE, e.g., receiving and decoding downlink transport blocks and transmitting them over sidelink, for minimizing the latency at the relay UE. The base station may determine that the selected TRP can be used for an extended resource allocation period and indicate the TRP in extended sidelink resource grant via an extended DCI format 5.

Figure 13:
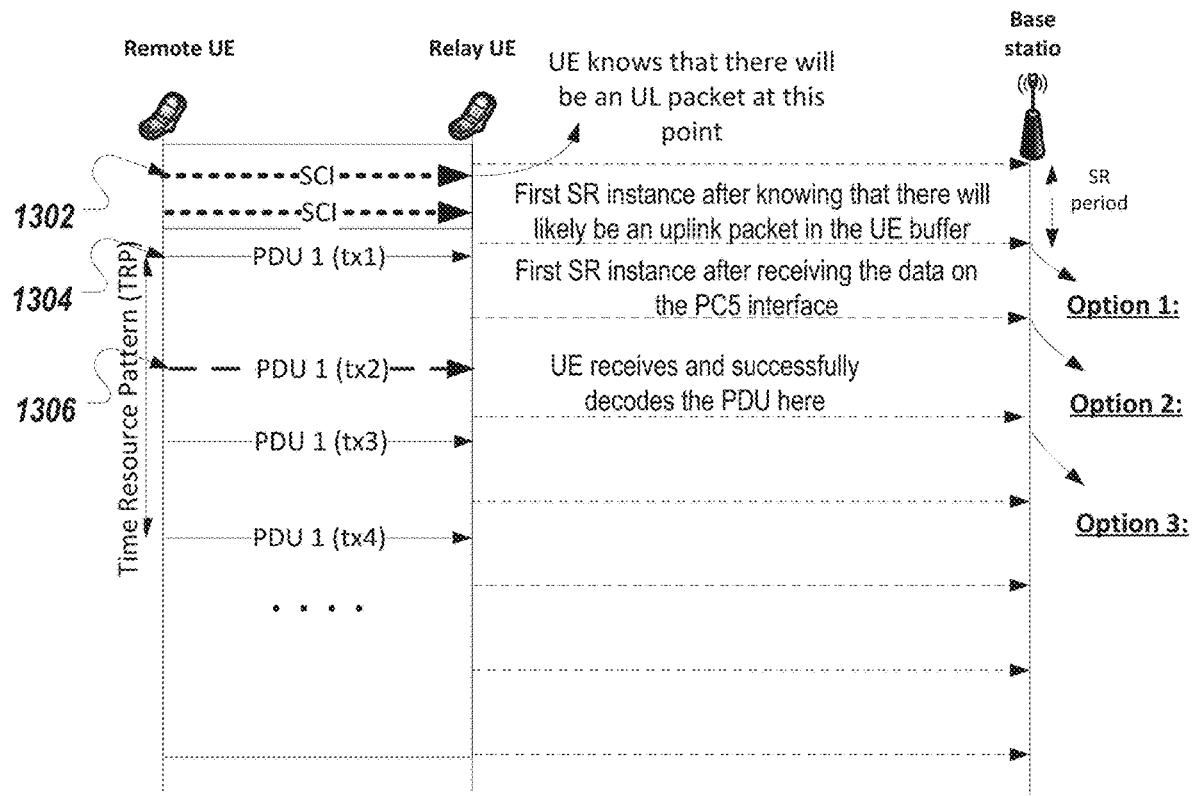
FIG. 13 is a message flow diagram illustrating an example scheduling request (SR) transmission process for a relay UE operating in an autonomous selection mode.

In some cases, the relay UE may determine the timing for transmitting Scheduling Request (SR) and/or Buffer Status Report (BSR) on the Uu interface for Uu uplink resource allocation based on the control information or data received on the PC5 interface. FIG. 13 is a message flow diagram illustrating an example SR transmission process 1300 for a relay UE operating in the autonomous selection mode. In some cases, the relay UE may transmit an SR at preconfigured SR instances. The preconfigured SR instances may occur at the beginning of each SR period.

The process 1300 may begin at 1302, where an SCI is received at the relay UE from the remote UE. Because the SCI indicates information for a pending sidelink data transmission, the relay UE may determine that the relay UE is likely to receive a data packet from the remote UE. Therefore, it is likely that the relay UE may need to request an uplink resource from the base station by sending an SR and then eventually sending a BSR. In some cases, the relay UE may transmit the SR at the first available SR opportunity or SR instance after receiving an SCI. This approach may minimize the delay between possible reception of one or more PDUs on the sidelink and the subsequent transmission of the one or more PDUs to the base station on the uplink and, therefore, may be useful for high delay-sensitive applications.

Subsequent to the transmission of SR, the relay UE sends a BSR to the base station to indicate the pending data in the relay UE's uplink buffer. The relay UE may estimate the amount of data based on the content of the SCI format 0 received from the remote UE, e.g., average number of subframes scheduled for transmission on the PSSCH, resulting allocated bandwidth, or modulation scheme. Upon receiving a BSR, in some cases, the base station may grant the uplink resource before the relay UE successfully decodes the PDU from the remote UE. In this case, the relay UE may send an additional BSR in the granted resource to indicate that the PDU has not yet been successfully decoded.

At 1304, the relay UE may receive a first redundancy version of the first PDU from the remote UE. In some cases, the remote UE may transmit a data packet to the relay UE using more than one redundancy versions. Each time the relay UE receives a redundancy version, the relay UE may combine it with previously received redundancy versions and attempt to decode the combined versions. In some cases, the relay UE may transmit the SR at the first SR instance after receiving a redundancy version of the data packet. This approach delays the SR slightly compared to the option where the UE sends the SR after receiving the SCI as described previously, but increases the likelihood that the PDU on the PC5 will have been successfully decoded prior to the uplink grant on the Uu interface. The relay UE may also send a BSR to the base station to indicate the buffer size. As discussed previously, if the uplink grant arrives before successful decoding of the PDU, the relay UE may indicate to the base station that there is further data to come in uplink by including another BSR in the granted resource.

At 1306, the relay UE successfully decodes at least one of the one or more PDUs from the remote UE. In the illustrated example, this happens when the second redundancy version of the PDU is received. In this case, the relay UE may transmit the SR after the PDU is successfully decoded. In some cases, the relay UE may transmit the SR after the SC period ends. The UE may determine the size of received PDU and send BSR to the base station accordingly. This latter approach eliminates the risk of wasted uplink grants and may be useful for delay tolerant applications.

Figure 14:
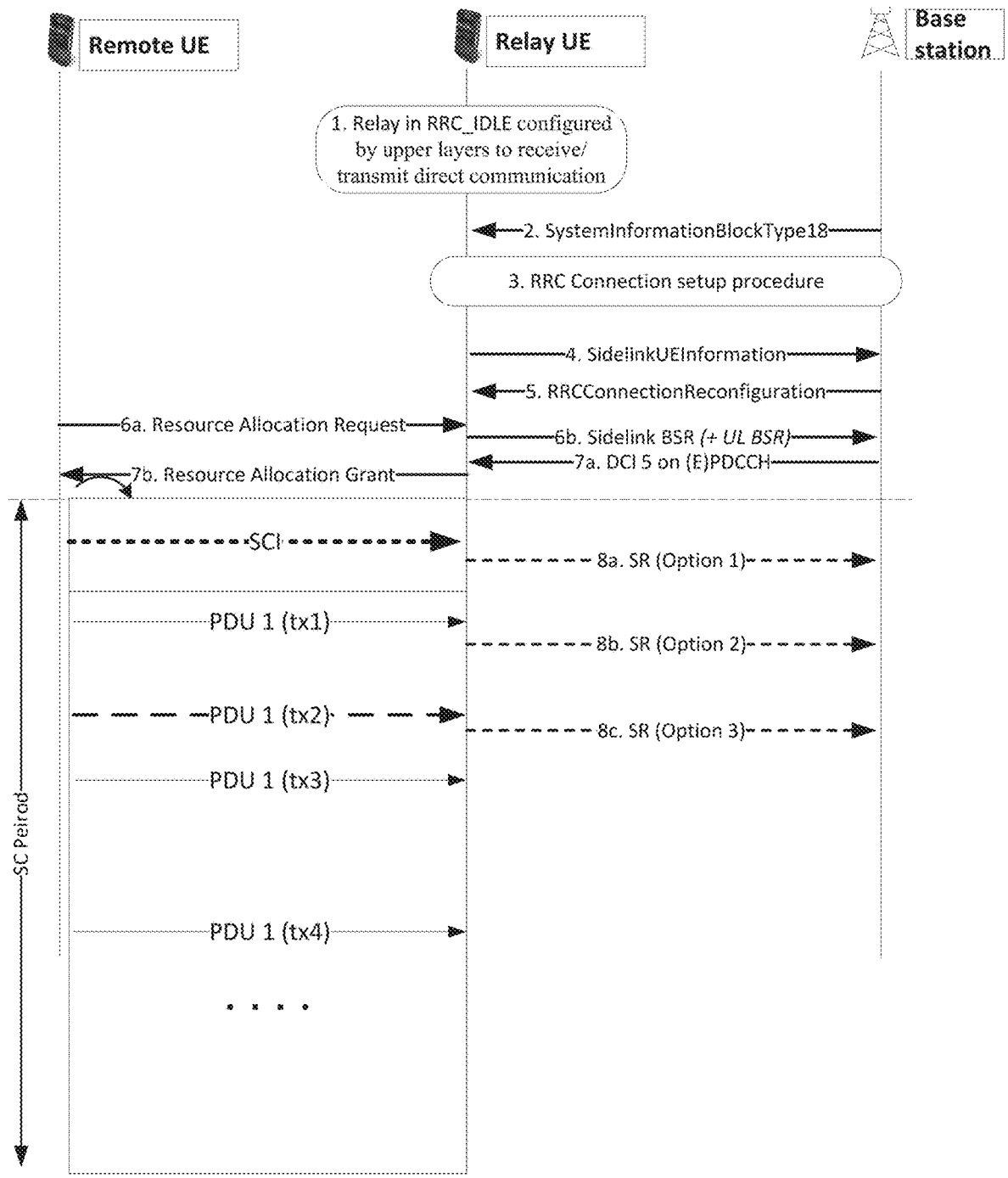
FIG. 14 is a message flow diagram illustrating an example SR transmission process for a relay UE operating in a network scheduled mode.

FIG. 14 is a message flow diagram illustrating an example SR transmission process 1400 for a relay UE operating in the network scheduled mode according to the technique described in FIG. 3 and associated description. The process 1400 may begin at step 1, where the relay UE is configured for D2D transmissions. At step 2, the relay UE receives a SIB message from the base station. At step 3, the relay UE enters into RRC CONNECTED state. At step 4, the relay UE transmits sidelink UE information to the base station. At step 5, the relay UE receives an RRC connection reconfiguration message from the base station.

At step 6a, the relay UE receives a resource allocation request from the second UE. At step 6b, the relay UE sends a sidelink BSR to the base station. In some cases, the relay UE may send an uplink BSR for uplink resource request on the Uu interface. Requesting Uu uplink resources before receiving the SCI may further reduce the delays. At step 7a, the base station sends the sidelink allocation information to the first UE. At step 7b, the first UE sends a resource allocation grant to the second UE. As discussed previously, the UE may transmit an SR at step 8a, which is the first SR instance after receiving the SCI. The UE may also transmit an SR at step 8b, which is the first SR instance after receiving the first redundancy version of the PDU from the remote UE, or at step 8c, which is the first SR instance after successfully decoding the PDU.

Figure 15:
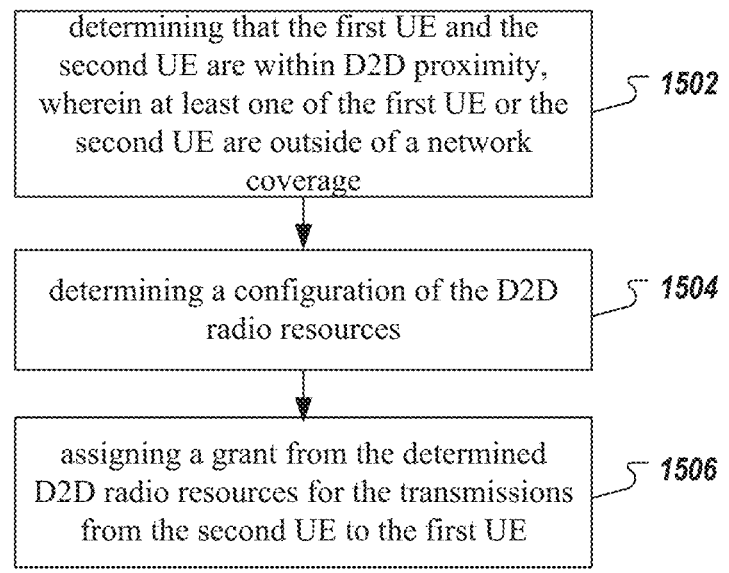
FIG. 15 is a flowchart illustrating an example method for allocating resources for D2D transmissions.

FIG. 15 is a flowchart illustrating an example method 1500 for allocating resources for D2D transmissions. The method 1500 may begin at block 1502, where the first UE and the second UE are determined to be within D2D proximity. At least one of the first UE or the second UE is outside of a network coverage. In some cases, determining the D2D proximity includes discovery between the first UE and second UE.

At block 1504, a configuration of the D2D radio resources is determined. In some cases, the configuration of the D2D radio resources is determined to substantially reduce D2D transmission collisions between the first UE and the second UE. In some cases, the determination is made by a base station. In some cases, the determination is based on the preconfigured D2D transmission resource within the second UE. In some cases, the determination is made by the first UE within the D2D radio resources configured by the base station.

At block 1506, a grant from the determined D2D radio resources for the transmissions from the second UE to the first UE is assigned. In some cases, the grant is assigned by the first UE.

Figure 16:
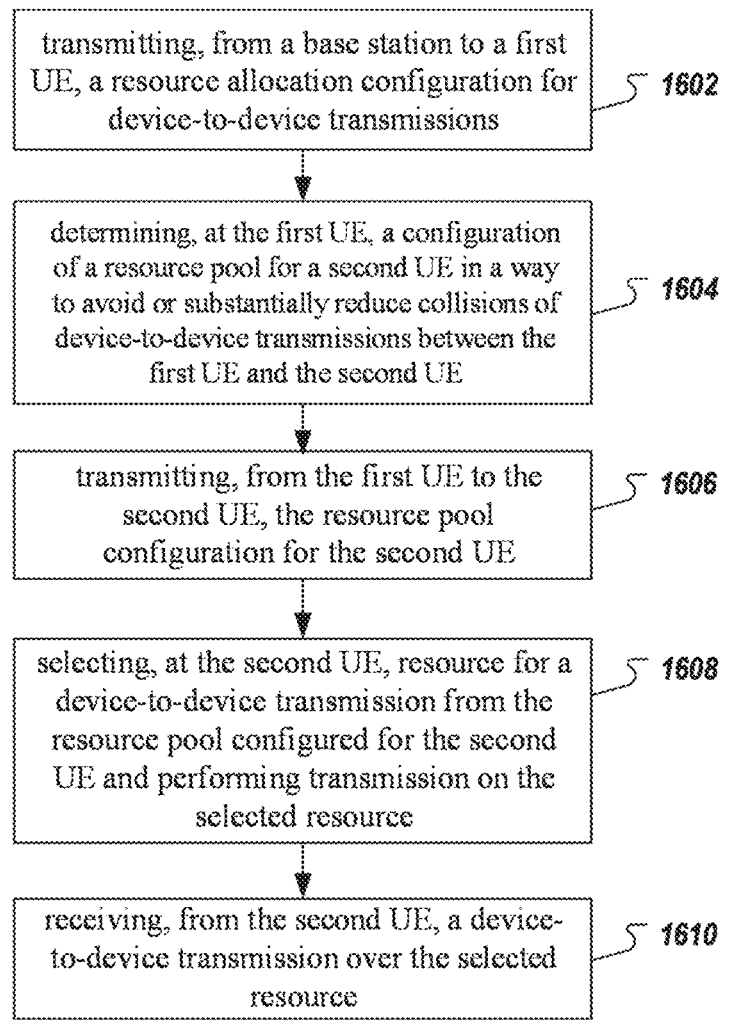
FIG. 16 is a flowchart illustrating another example method for allocating resources for D2D transmissions.

FIG. 16 is a flowchart illustrating another example method 1600 for allocating resources for D2D transmissions. The method 1600 may begin at block 1602, where a resource allocation configuration is transmitted from a base station to a first UE for device-to-device transmission. In some cases, the first UE operates in an autonomous allocation mode or a network scheduled mode.

At block 1604, the first UE determines a configuration of the resource pool for the second UE within the resource pool configured by the base station in such a way to avoid or substantially reduce simultaneous transmissions between the first UE and the second UE, or collisions of device-to-device transmissions between the first UE and the second UE. In some cases the second UE operates in autonomous selection mode. At block 1606, the first UE transmits to the second UE the resource pool configuration for the second UE At block 1608, the second UE selects resource for the device-to-device transmission from the resource pool configured for the second UE and performs transmission on the selected resource.

At block 1610, a device-to-device transmission is received from the second UE over the selected resource.

Figure 17:
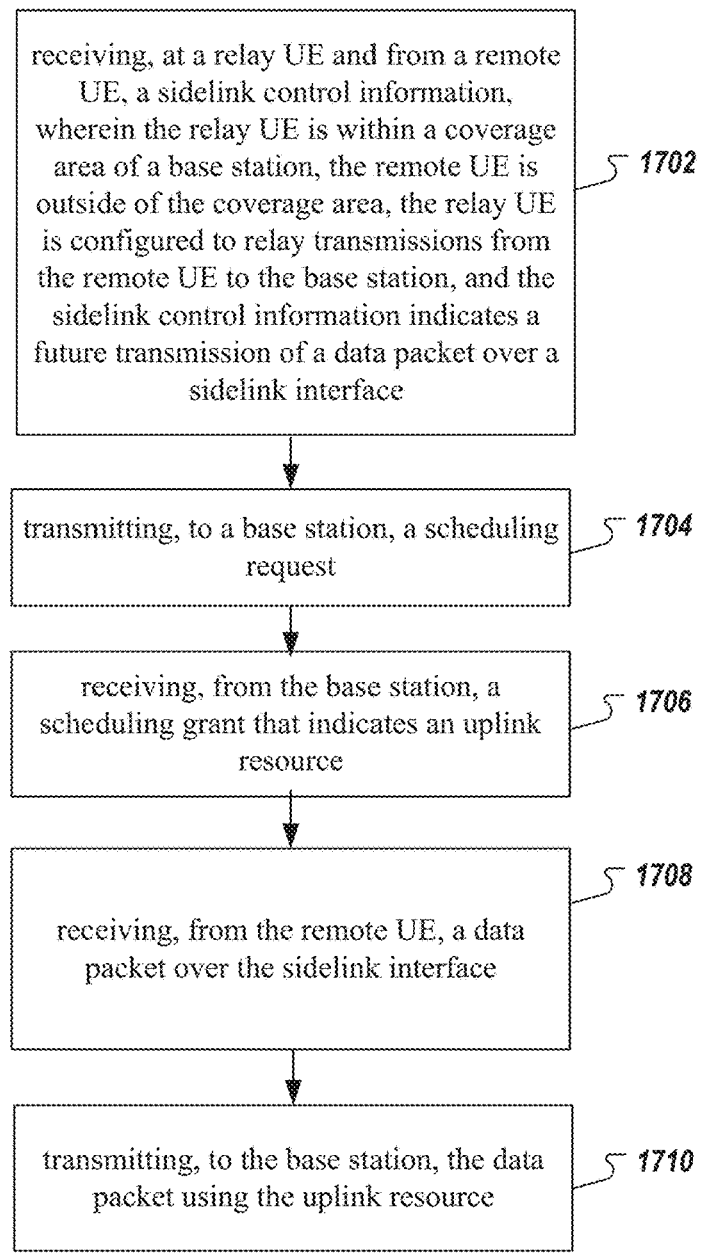
FIG. 17 is a flowchart illustrating an example method for transmitting a scheduling request.

FIG. 17 is a flowchart illustrating an example method 1700 for transmitting a scheduling request. The method 1700 may begin at block 1702, where a sidelink control information is received at a relay UE from a remote UE. The relay UE is within a coverage area of a base station. The remote UE is outside of the coverage area. The relay UE is configured to relay transmissions from the remote UE to the base station. The sidelink control information indicates a future transmission of a data packet over a sidelink channel. In some cases, the remote UE operates in an autonomous selection mode. In some cases, the sidelink resource for the remote UE transmission is allocated by the relay UE or is scheduled by the network.

At block 1704, a scheduling request is transmitted to a base station. In some cases, the scheduling request is transmitted to the base station before transmission of the data packet. In some cases, the data packet is transmitted in more than one redundancy version, and the scheduling request is transmitted to the base station in response to receiving one or more redundancy versions of the data packet. In some cases, the scheduling request is transmitted to the base station after the data packet is decoded at the relay UE. In some cases, a buffer status report that indicates a buffer size associated with the scheduling request is transmitted to the base station.

At block 1706, a scheduling grant that indicates an uplink resource is received from the base station. At block 1708, a data packet over the sidelink channel is received from the remote UE. At block 1710, the data packet is transmitted to the base station using the uplink resource.

Figure 18:
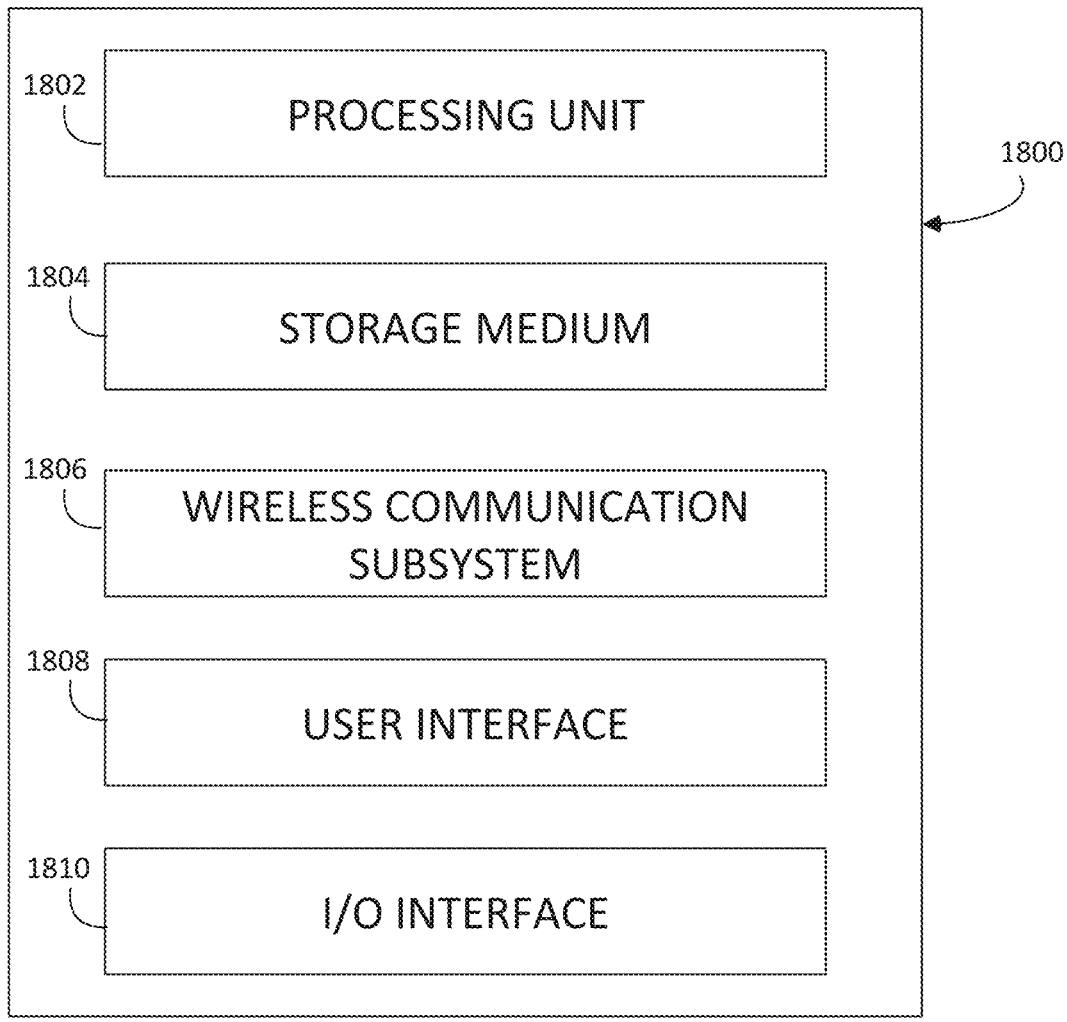
FIG. 18 is a block diagram illustrating an example user equipment (UE) device.

FIG. 18 is a block diagram illustrating an example user equipment (UE) device 1800. The illustrated device 1800 includes a processing unit 1802, a computer-readable storage medium 1804 (for example, ROM or flash memory), a wireless communication subsystem 1806, a user interface 1808, and an I/O interface 1810.

The processing unit 1802 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 1802 may be configured to generate control information, such as a measurement report, or respond to received information, such as control information from a network node. The processing unit 1802 may also be configured to make a Radio Resource Management (RRM) decision such as cell selection/reselection information or trigger a measurement report. The processing unit 1802 can also include other auxiliary components, such as random access memory (RAM) and read-only memory (ROM). The computer-readable storage medium 1804 can store an operating system (OS) of the device 1800 and various other computer-executable instructions, logic or software programs for performing one or more of the processes, steps, or actions described above.

The wireless communication subsystem 1806 may be configured to provide wireless communication for voice, data, and/or control information provided by the processing unit 1802. The wireless communication subsystem 1806 can include, for example, one or more antennas, a receiver, a transmitter, a local oscillator, a mixer, and a digital signal processing (DSP) unit. In some implementations, the subsystem 1806 can support multiple-input multiple-output (MIMO) transmissions. In some implementations, the receiver in the wireless communication subsystems 1806 can be an advance receiver or a baseline receiver. Two receivers can be implemented with identical, similar, or different receiver processing algorithms.

The user interface 1808 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1810 can include, for example, a universal serial bus (USB) interface. Various other components can also be included in the device 1800. A number of embodiments of the invention have been described. Nevertheless, it will be understood that various modifications may be made. Accordingly, other embodiments are within the scope of the following claims.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method for coordinating selection of radio resources between UEs (user equipments) capable of direct communication, comprising:
    transmitting, by a first UE to a second UE, a request to receive information of a first radio resource, wherein the first radio resource is selected by the second UE, and the first radio resource is used by the second UE for a first direct communication;
    in response to transmitting the request, receiving, at the first UE and from the second UE, the information of the first radio resource that is used by the second UE for the first direct communication; and
    in response to receiving the information of the first radio resource, selecting, at the first UE, a second radio resource, wherein the second radio resource is different from the first radio resource, and the second radio resource is used by the first UE for a second direct communication, wherein the first direct communication and the second direct communication are UE-to-UE communication.

2. The method of claim 1, wherein the direct communication is a sidelink communication.

3. The method of claim 1, wherein at least one of the first UE and the second UE is a relay UE.

4. The method of claim 1, wherein the information of the first radio resource includes a timing pattern.

5. The method of claim 1, wherein the information of the first radio resource includes radio scheduling information.

6. The method of claim 1, wherein the information of the first radio resource includes radio frequency information.

7. The method of claim 1, wherein the information of the first radio resource includes information describing a pool of radio resources.

8. The method of claim 1, wherein the information of the first radio resource includes an identification of a pool of radio resources.

9. The method of claim 1, wherein the information of the first radio resource is received by the first UE over a radio interface used for direct communication.

10. The method of claim 1, wherein the second UE operates in an autonomous resource selection mode.

11. The method of claim 1, wherein the second UE operates in a mode by which radio resources for direct communication are scheduled by a network.

12. The method of claim 1, wherein the request is transmitted over at least one of a direct communication radio interface and a radio interface with a network.

13. The method of claim 1, wherein the information of the first radio resource for direct communication is received periodically.

14. The method of claim 1, wherein the first UE and the second UE are in proximity.

15. A tangible, non-transitory computer-readable medium containing instructions which, when executed, cause one or more computing devices to perform a method for coordinating selection of radio resources between UEs (user equipments) capable of direct communication, the method comprising:
    transmitting, by a first UE to a second UE, a request to receive information of a first radio resource, wherein the first radio resource is selected by the second UE, and the first radio resource is used by the second UE for a first direct communication between;
    in response to transmitting the request, receiving, at the first UE and from the second UE, the information of the first radio resource that is used by the second UE for the first direct communication; and
    in response to receiving the information of the first radio resource, selecting, at the first UE, a second radio resource, wherein the second radio resource is different from the first radio resource, and the second radio resource is used by the first UE for a second direct communication, wherein the first and the second direct communication are UE-to-UE communication.

16. A first user equipment (UE), comprising:
a memory; and
at least one hardware processor communicatively coupled with the memory and configured to perform a method for coordinating selection of radio resources between UEs capable of direct communication, the method comprising:
transmitting, by the first UE to a second UE, a request to receive information of a first radio resource, wherein the first radio resource is selected by the second UE, and the first radio resource is used by the second UE for a first direct communication
in response to transmitting the request, receiving, at the first UE and from the second UE, the information of the first radio resource that is used by the second UE for the first direct communication; and
in response to receiving the information of the first radio resource, selecting, at the first UE, a second radio resource, wherein the second radio resource is different from the first radio resource, and the second radio resource is used by the first UE for a second direct communication, wherein the first and the second direct communication are UE-to-UE communication.

17. The first UE of claim 16, wherein the direct communication is a sidelink communication.

* * * * *